(12) United States Patent
Imamura et al.

(10) Patent No.: US 9,132,747 B2
(45) Date of Patent: Sep. 15, 2015

(54) CONTROL DEVICE OF VEHICLE DRIVE DEVICE

(75) Inventors: Tatsuya Imamura, Okazaki (JP); Atsushi Tabata, Okazaki (JP); Tooru Matsubara, Toyota (JP); Koichi Okuda, Toyota (JP); Kenta Kumazaki, Toyota (JP); Keita Imai, Toyota (JP); Shunya Kato, Toyota (JP); Yasuhiro Hiasa, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 86 days.

(21) Appl. No.: 13/989,695

(22) PCT Filed: Nov. 26, 2010

(86) PCT No.: PCT/JP2010/071181
§ 371 (c)(1),
(2), (4) Date: May 24, 2013

(87) PCT Pub. No.: WO2012/070156
PCT Pub. Date: May 31, 2012

(65) Prior Publication Data
US 2013/0245875 A1 Sep. 19, 2013

(51) Int. Cl.
*B60L 15/20* (2006.01)
*B60K 6/44* (2007.10)
(Continued)

(52) U.S. Cl.
CPC . *B60L 15/20* (2013.01); *B60K 6/44* (2013.01); *B60K 6/442* (2013.01); *B60K 6/448* (2013.01); *B60K 6/547* (2013.01); *B60W 10/023* (2013.01); *B60W 10/06* (2013.01); *B60W 10/08* (2013.01); *B60W 20/00* (2013.01); *B60W 30/1882* (2013.01); *B60K 2006/4825* (2013.01); *B60W 2510/1025* (2013.01); *B60W 2710/025* (2013.01); *B60Y 2400/426* (2013.01);
(Continued)

(58) Field of Classification Search
CPC .......... B60L 15/20; B60K 6/44; B60K 6/547; B60K 6/442; B60K 6/448; B60K 2006/4825; B60W 10/023; B60W 10/06; B60W 10/08; B60W 20/00; B60W 30/1882; B60W 2710/025; B60W 2510/1025; B60Y 2400/426; F16H 2059/467; F16H 2200/0013; F16H 2200/006; F16H 2200/2023; Y02T 10/6226; Y02T 10/623; Y02T 10/6252; Y02T 10/6286; Y02T 10/7258
USPC .......................................................... 701/22
See application file for complete search history.

(56) References Cited

U.S. PATENT DOCUMENTS

| 2001/0005704 A1 | 6/2001 | Kitano et al. |
| 2008/0004156 A1* | 1/2008 | Tabata et al. ...................... 477/3 |

(Continued)

FOREIGN PATENT DOCUMENTS

| JP | A-2000-197209 | 7/2000 |
| JP | A-2000-225871 | 8/2000 |

(Continued)

*Primary Examiner* — Calvin Cheung
*Assistant Examiner* — Courtney Heinle
(74) *Attorney, Agent, or Firm* — Oliff PLC

(57) ABSTRACT

A control device of a vehicle drive device includes: a hydraulic power transmission device including an input-side rotating element to which power from an engine is input and an output-side rotating element outputting power to drive wheels; a first electric motor directly or indirectly coupled to the input-side rotating element; and a second electric motor directly or indirectly coupled to the drive wheels.

19 Claims, 12 Drawing Sheets

(51) Int. Cl.

| | | |
|---|---|---|
| *B60K 6/547* | (2007.10) | |
| *B60W 10/02* | (2006.01) | |
| *B60W 10/06* | (2006.01) | |
| *B60W 10/08* | (2006.01) | |
| *B60W 20/00* | (2006.01) | |
| *B60W 30/188* | (2012.01) | |
| *B60K 6/442* | (2007.10) | |
| *B60K 6/448* | (2007.10) | |
| *B60K 6/48* | (2007.10) | |
| *F16H 59/46* | (2006.01) | |

(52) U.S. Cl.
CPC ..... *F16H2059/467* (2013.01); *F16H 2200/006* (2013.01); *F16H 2200/0013* (2013.01); *F16H 2200/2023* (2013.01); *Y02T 10/623* (2013.01); *Y02T 10/6226* (2013.01); *Y02T 10/6252* (2013.01); *Y02T 10/6286* (2013.01); *Y02T 10/7258* (2013.01)

(56) References Cited

U.S. PATENT DOCUMENTS

| | | | |
|---|---|---|---|
| 2008/0254940 A1* | 10/2008 | Stoffels et al. | 477/107 |
| 2009/0209382 A1* | 8/2009 | Tabata et al. | 475/5 |
| 2009/0326778 A1* | 12/2009 | Soliman et al. | 701/84 |
| 2011/0005215 A1 | 1/2011 | Ota et al. | |
| 2011/0118947 A1* | 5/2011 | Endo et al. | 701/59 |

FOREIGN PATENT DOCUMENTS

| | | |
|---|---|---|
| JP | A-2001-180318 | 7/2001 |
| JP | A-2007-191049 | 8/2007 |
| JP | A-2007-246057 | 9/2008 |
| JP | A-2008-261337 | 10/2008 |
| JP | A-2009-220618 | 10/2009 |
| JP | A-2009-250380 | 10/2009 |
| WO | 2006/106894 A1 | 10/2006 |

* cited by examiner

|     | C1 | C2 | C3 | C4 | B1 | B2 |
|-----|----|----|----|----|----|----|
| 1st | O  |    |    |    |    | O  |
| 2nd | O  |    |    |    | O  |    |
| 3rd | O  |    | O  |    |    |    |
| 4th | O  |    |    | O  |    |    |
| 5th | O  | O  |    |    |    |    |
| 6th |    | O  |    | O  |    |    |
| 7th |    | O  | O  |    |    |    |
| 8th |    | O  |    |    | O  |    |
| Rev1|    |    | O  |    |    | O  |
| Rev2|    |    |    | O  |    | O  |

CONTROL DEVICE OF VEHICLE DRIVE DEVICE

TECHNICAL FIELD

The present invention relates to a drive control of an engine in a vehicle drive device including the engine, an electric motor, and a hydraulic power transmission device.

BACKGROUND ART

A control device of a vehicle drive device including an engine, an electric motor, and a hydraulic power transmission device is conventionally known. For example, this corresponds to a control device of a vehicle drive device described in Patent Document 1. According to Patent Document 1, the hydraulic power transmission device is a torque converter and includes a pump impeller to which power from an engine is input, a turbine impeller outputting power to drive wheels, and a stator impeller rotatably disposed between the pump impeller and the turbine impeller. The electric motor is coupled to the stator impeller. The control device of Patent Document 1 drives the electric motor to change the capacity (capacitive coefficient) of the torque converter.

PRIOR ART DOCUMENTS

Patent Documents

Patent Document 1: Japanese Laid-Open Patent Publication No. 2009-220618
Patent Document 2: Japanese Laid-Open Patent Publication No. 2009-250380

SUMMARY OF THE INVENTION

Problem to be Solved by the Invention

Although the control device of a vehicle drive device of Patent Document 1 can change the capacity of the torque converter through driving of the electric motor, since an operating point of an engine is passively determined depending on engine output and characteristics of the torque converter, the operating point of the engine cannot always be controlled such that a lower fuel consumption rate of the engine is achieved, for example, and vehicle fuel efficiency may deteriorate. Such a problem is not known.

The present invention was conceived in view of the situations and it is therefore an object of the present invention to provide a control device of a vehicle drive device capable of improving vehicle fuel efficiency by adjusting a torque of the electric motor to control an operating point of an engine.

Means for Solving the Problem

To achieve the object, the present invention provides (a) a control device of a vehicle drive device comprising: a hydraulic power transmission device including an input-side rotating element to which power from an engine is input and an output-side rotating element outputting power to drive wheels; a first electric motor directly or indirectly coupled to the input-side rotating element; and a second electric motor directly or indirectly coupled to the drive wheels, (b) the control device directly or indirectly adjusting a torque of the first electric motor to control an operating point of the engine, (c) the control device transmitting a torque of the second electric motor to the drive wheels.

Effect of the Invention

Consequently, since adjusting the torque of the first electric motor enables the operating point of the engine to be controlled without being constrained by the rotation speed of the output-side rotating element, the engine can be driven at an operating point optimal for the fuel efficiency improvement (fuel efficiency optimum point), for example, and the vehicle fuel efficiency can be improved.

Assuming that, for example, the hydraulic power transmission device is replaced with a planetary gear device including a rotating element coupled to the engine, a rotating element coupled to the first electric motor, and a rotating element coupled to the drive wheels, it is considered that this configuration enables the adjustment of torque of the first electric motor to control the operating point of the engine because of a differential action of the planetary gear device. However, the present invention has various advantages over such a configuration having the planetary gear device in place of the hydraulic power transmission device. For example, in the configuration having the planetary gear device in place of the hydraulic power transmission device, the first electric motor must generate a torque so as to transmit power from the engine to the drive wheels and, therefore, if the function of the first electric motor is limited because of failure etc., of the first electric motor, the vehicle is almost unable to run with the engine; however, even if the function of the first electric motor is limited in the present invention, only the control of the operating point of the engine is limited and the vehicle can run with the engine by using the same output as normal engine vehicles. Since the configuration having the planetary gear device in place of the hydraulic power transmission device causes high rotation and high torque of the first electric motor during high output of the engine, high output of the first electric motor is required; however, the present invention enables the hydraulic power transmission device to transmit a larger portion of the power of the engine and, therefore, the output of the first electric motor can be kept lower. For example, if the hydraulic power transmission device is a torque converter, a sufficient starting torque is easily acquired at the time of vehicle start because of a torque amplification effect of the torque converter and, therefore, the vehicle can smoothly be started as compared to the configuration having the planetary gear device in place of the hydraulic power transmission device.

As compared to a configuration having, for example, a friction clutch in place of the hydraulic power transmission device, the present invention has an advantage that the operating point of the engine is easily controlled without necessity of complicated operation of the friction clutch.

For example, the fuel efficiency refers to a running distance per unit fuel consumption etc., and improvement in fuel efficiency refers to extension of the running distance per unit fuel consumption, or reduction in fuel consumption rate (=fuel consumption/drive wheel output) of the vehicle as a whole. Contrarily, deterioration in fuel efficiency refers to shortening of the running distance per unit fuel consumption or increase in fuel consumption rate of the vehicle as a whole.

The operating point of the engine is an operating point indicative of an operating state of the engine represented by rotation speed and output torque of the engine etc. In other words, the operating point of the engine refers to an operating state of the engine indicated by one point in two-dimensional coordinates of an axis indicative of rotation speed of the engine and an axis indicative of output torque of the engine.

Preferably, the torque of the first electric motor is adjusted so that a sum of an engine torque and the torque of the first electric motor is balanced with an input-side load torque generated in the input-side rotating element depending on a speed ratio of the hydraulic power transmission device. Consequently, the torque of the first electric motor can easily be adjusted based on the characteristics of the hydraulic power transmission device.

Preferably, (a) the vehicle drive device includes an automatic transmission interposed between the output-side rotating element and the drive wheels, and wherein (b) the operating point of the engine is controlled by determining a gear ratio of the automatic transmission and directly or indirectly adjusting the torque of the first electric motor. Consequently, since the input-side load torque can be increased and decreased without changing the operating point of engine by changing the gear ratio of the automatic transmission, the engine itself can be driven at higher efficiency and, as compared to the case that the automatic transmission is not shifted, power can be transmitted from the engine to the drive wheels at higher efficiency.

Preferably, the gear ratio of the automatic transmission is changed to the side of higher combined transmission efficiency achieved when power from the engine is transmitted through an electric path, through which power transmission is electrically performed by giving and receiving electric power between the first electric motor and the second electric motor, and a mechanical path, through which power transmission is mechanically performed via the hydraulic power transmission device. Consequently, since the combined transmission efficiency is increased as compared to the case that the automatic transmission is not shifted in association with the combined transmission efficiency, the loss in power transmission is reduced and the vehicle fuel efficiency can be improved.

Preferably, a determinable gear ratio of the automatic transmission is limited depending on an electric power upper limit value allowed for the first electric motor or the second electric motor. Consequently, if the output of the first electric motor or the second electric motor is limited depending on the electric power upper limit value, the torque shortage of the first electric motor or the second electric motor due to the output limitation can be avoided.

Preferably, (a) the operating point of the engine is controlled so that the operating point of the engine is located along a predetermined operating curve of the engine while a target value of engine output is achieved, and wherein (b) a change to a gear ratio of the automatic transmission causing power circulation in which the first electric motor consumes electric power while the second electric motor generates electricity is restricted, for example, inhibited. Consequently, although power transmission efficiency from the engine to the drive wheels i.e., the combined transmission efficiency is considerably reduced if the power circulation is caused, the automatic transmission is shifted to reduce the opportunity of causing the power circulation, and therefore, a loss in power transmission from the engine to the drive wheels is suppressed and the deterioration in vehicle fuel efficiency can be suppressed.

Preferably, the operating point of the engine is shifted to the side of a larger product of combined transmission efficiency and engine efficiency achieved when power from the engine is transmitted through an electric path, through which power transmission is electrically performed by giving and receiving electric power between the first electric motor and the second electric motor, and a mechanical path, through which power transmission is mechanically performed via the hydraulic power transmission device. Consequently, as compared to the case that the operating point of the engine is not changed depending on the product of the combined transmission efficiency and the engine efficiency, the efficiency of the vehicle drive device is increased as a whole and the vehicle fuel efficiency can be improved.

Preferably, the operating point of the engine is shifted to the side of a smaller total loss acquired by summing a power transmission loss and a loss of the engine generated when power from the engine is transmitted through an electric path, through which power transmission is electrically performed by giving and receiving electric power between the first electric motor and the second electric motor, and a mechanical path, through which power transmission is mechanically performed via the hydraulic power transmission device. Consequently, as compared to the case that the operating point of the engine is not changed depending on the total loss, the efficiency of the vehicle drive device is increased as a whole, i.e., a power loss is reduced, and the vehicle fuel efficiency can be improved.

Preferably, the hydraulic power transmission device is a torque converter including a pump impeller acting as the input-side rotating element, a turbine impeller acting as the output-side rotating element, and a stator impeller.

Preferably, the operating curve of the engine is a minimum fuel consumption rate line defined in advance such that the fuel consumption rate of the engine is minimized.

Preferably, (a) the vehicle drive device includes an electric storage device connected to each of the first electric motor and the second electric motor such that electric power can be given/received and (b) the electric power upper limit value is determined based on a target value of charging power to be stored in the electric storage device. For example, the electric power upper limit value is set lower when the target value of the charging power is larger.

Preferably, required charging power acting as the target value of the charging power is reduced based on output of the first electric motor or the second electric motor required for controlling the operating point of the engine during a predetermined electric motor drive priority time.

Preferably, the electric power upper limit value is determined such that durability of the first electric motor, the second electric motor, or an inverter for controlling the electric motors is ensured. To prevent deterioration of the durability due to higher temperature of the first electric motor, the second electric motor, or the inverter, the electric power upper limit value is set lower when the temperature of the first electric motor, the second electric motor, or the inverter is higher.

Preferably, the gear ratio of the automatic transmission is determined based on the speed ratio of the hydraulic power transmission device.

Preferably, the second electric motor is supplied with a remaining portion of the electric power generated by the first electric motor after subtracting electric power to be stored into the electric storage device, so as to drive the second electric motor.

Preferably, directly or indirectly adjusting the torque of the first electric motor refers to adjusting power (electric power) transmitted through the electric path, or in other words, adjusting a power transmission rate of the electric path or the mechanical path. Therefore, the operating point of the engine is controlled by adjusting the power transmitted through the electric path.

Preferably, the electric path is a power transmission path through which power is electrically transmitted by supplying all or a portion of the electric power generated by the first electric motor to the second electric motor.

MODES FOR CARRYING OUT THE INVENTION

One embodiment of the present invention will now be described in detail with reference to the drawings.

First Embodiment

Figures 1, 2:
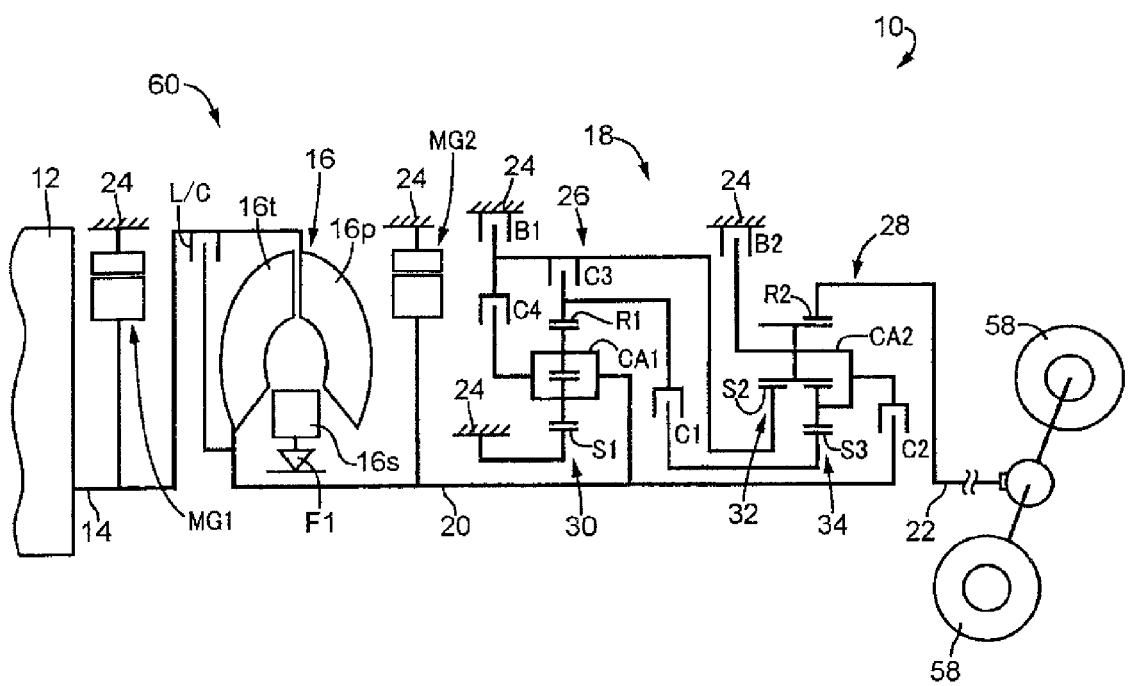
FIG. 1 is a schematic for explaining a configuration of a vehicle drive device of one embodiment of the present invention.
FIG. 2 is an operation table of hydraulic friction engagement devices for establishing shift stages in the automatic transmission depicted in FIG. 1.

FIG. 1 is a schematic for explaining a configuration of a vehicle drive device 10 of one embodiment of the present invention. In FIG. 1, the vehicle drive device 10 is preferably employed in FR (front-engine rear-drive) type vehicles and includes an engine 12 made up of an internal-combustion engine, a torque converter (hydraulic power transmission device) 16 coupled to a crankshaft 14 of the engine 12, an automatic transmission 18 disposed between the torque converter 16 and drive wheels 58 and coupled to the output side of the torque converter 16, a first electric motor MG1 disposed between the engine 12 and the torque converter 16 and coupled to the crankshaft 14, and a second electric motor MG2 disposed between the torque converter 16 and the automatic transmission 18 and coupled to an input shaft 20 of the automatic transmission 18. The torque converter 16, the automatic transmission 18, the first electric motor MG1, the second electric motor MG2, etc., are configured symmetrically relative to the common axial center thereof and the lower halves thereof from the axial center are not depicted in FIG. 1.

The torque converter 16 is a hydraulic power transmission device including a pump impeller 16p acting as an input-side rotating element to which power from the engine 12 is input, a turbine impeller 16t acting as an output-side rotating element outputting power to the drive wheels 58, a stator impeller 16s, and a unidirectional clutch F1. The pump impeller 16p, i.e., a pump impeller, is coupled to the crankshaft 14 of the engine 12 and the first electric motor MG1 and is rotationally driven by the engine 12 to generate a fluid flow due to a flow of operating oil in the torque converter 16. The turbine impeller 16t, i.e., a turbine runner, is coupled to the input shaft 20 of the automatic transmission 18 and rotated in response to the fluid flow from the pump impeller 16p. The stator impeller 16s is disposed in the fluid flow from the pump impeller 16p to the turbine impeller 16t and supported by the unidirectional clutch F1 rotatably in the positive rotation direction of the crankshaft 14 (the rotation direction of the crankshaft 14 during the operation of the engine 12) and non-rotatably in the negative rotation direction. The input shaft 20 of the automatic transmission 18 also acts as an output shaft, i.e., a turbine shaft, of the torque converter 16. As can be seen from FIG. 1, since the engine 12, the first electric motor MG1, and the pump impeller 16p are coupled in series in this embodiment, a rotation speed Np of the pump impeller 16p (hereinafter referred to as a pump rotation speed Np) is the same as a rotation speed $N_{MG1}$ of the first electric motor MG1 (hereinafter referred to as a first electric motor rotation speed $N_{MG1}$) and an engine rotation speed Ne. Since the turbine impeller 16t, the second electric motor MG2, and the input shaft 20 of the automatic transmission 18 are coupled in series, a rotation speed Nt of the turbine impeller 16t (hereinafter referred to as a turbine rotation speed Nt) is the same as a rotation speed $N_{MG2}$ of the second electric motor MG2 (hereinafter referred to as a second electric motor rotation speed $N_{MG2}$) and a rotation speed $N_{ATIN}$ of the input shaft 20.

In the torque converter 16, when the pump impeller 16p is rotated by torque from the engine 12, the rotation of the pump impeller 16p is transmitted via the operating oil to the turbine impeller 16t and the turbine impeller 16t is rotated. This state is referred to as a forward drive state of the torque converter 16. As a result, the torque of the engine 12 is transmitted to the input shaft 20. Contrary to this case, when the turbine impeller 16t is rotated by torque from the drive wheels 58, for example, during coasting (during inertia running with acceleration turned off), the rotation of the turbine impeller 16t is transmitted via the operating oil to the pump impeller 16p and the pump impeller 16p is rotated. This state is referred to as a reverse drive state of the torque converter 16. As a result, the torque from the drive wheels 58 is transmitted to the engine 12. In the torque converter 16, a torque amplification effect is acquired when the stator impeller 16s is non-rotatably fixed via the unidirectional clutch F1 in a torque converter range, and reduction in efficiency is suppressed when the stator impeller 16s is put into a free rotation state in a coupling range.

The torque converter 16 includes a lockup clutch L/C disposed between the pump impeller 16p and the turbine impeller 16t. The lockup clutch L/C is controlled to be in one of a completely engaged state, a slipping state, and a released state. When the lockup clutch L/C is in the released state, the torque is transmitted between the crankshaft 14 and the input shaft 20 via the operating oil in the torque converter 16 as described above. When the lockup clutch L/C is in the completely engaged state, the crankshaft 14 of the engine 12 and the input shaft 20 of the automatic transmission 18 are integrally coupled to each other and the torque is directly transmitted between the crankshaft 14 and the input shaft 20 without the intervention of the operating oil in the torque converter 16.

The first electric motor MG1 is coupled to the crankshaft 14 of the engine 12 in series via a damper etc., absorbing pulsation, for example, and is directly coupled to the pump impeller 16p of the torque converter 16. The second electric motor MG2 is coupled to the drive wheels 58 indirectly via the automatic transmission 18 etc. The first electric motor MG1 and the second electric motor MG2 are rotators configured to selectively acquire a function as an electric motor generating a drive torque and a function as an electric generator generating a regenerative torque and are made up of AC synchronous motor generators, for example. An electric storage device 36 acting as a battery and an inverter 38 for controlling the electric motors MG1 and MG2 are disposed in the vehicle drive device 10 (see FIG. 4), and the electric storage device 36, the first electric motor MG1, and the second electric motor MG2 are connected such that electric power can mutually be given/received. The first electric motor MG1 and the second electric motor MG2 can apply a drive torque in the positive rotation direction to the crankshaft 14 and the input shaft 20 respectively through the drive thereof and can apply a load torque, i.e., a braking torque in the negative rotation direction to the crankshaft 14 and the input shaft 20 through the electric generation (regeneration) thereof while charging the electric storage device 36 disposed in a vehicle via the inverter 38. The positive rotation direction of the crankshaft 14 and the input shaft 20 is the rotation direction of the crankshaft 14 while the engine 12 is driven and the negative rotation direction is the rotation direction opposite to the positive rotation direction.

In the vehicle drive device 10, a so-called fuel cut is performed to interrupt fuel supply to the engine 12 during coasting of the vehicle. As a result, the fuel consumption of the engine 12 is reduced and the vehicle fuel efficiency is improved. When the engine 12 is started during engine stop while vehicle is running, such as when the fuel cut performed during coasting of the vehicle is canceled, the first electric motor MG1 is used as an engine starter motor applying a drive torque in the positive rotation direction to the crankshaft 14 for starting the engine.

The automatic transmission 18 is interposed between the turbine impeller 16t of the torque converter 16 and the drive wheels 58 and is a transmission changing a speed of output of the torque converter 16 and the second electric motor MG2 for output from the output shaft 22. The automatic transmission 18 includes a first transmission portion 26 and a second transmission portion 28 housed in a transmission case 24 acting as a non-rotating member. The first transmission portion 26 is mainly made up of a double pinion type first planetary gear device 30. The second transmission portion 28 is mainly made up of a single pinion type second planetary gear device 32 and a double pinion type third planetary gear device 34.

In the first transmission portion 26, a sun gear S1 of the first planetary gear device 30 is coupled and non-rotatably fixed to the transmission case 24. A carrier CA1 of the first planetary gear device 30 is coupled to the input shaft 20 and coupled via a clutch C4 to a sun gear S2 of the second planetary gear device 32. A ring gear R1 of the first planetary gear device 30 is coupled via a clutch C1 to a sun gear S3 of the third planetary gear device 34 and coupled via a clutch C3 to the sun gear S2 of the second planetary gear device 32.

In the second transmission portion 28, the sun gear S2 of the second planetary gear device 32 is coupled via a brake B1 and non-rotatably fixed to the transmission case 24. A carrier CA2 of the second planetary gear device 32 and the third planetary gear device 34 is coupled via a brake B2 and non-rotatably fixed to the transmission case 24 and is coupled via a clutch C2 to the input shaft 20. A ring gear R2 of the second planetary gear device 32 and the third planetary gear device 34 is coupled and non-rotatably fixed to the output shaft 22.

The clutches C1 to C4 and the brakes B1 and B2 are hydraulic friction engagement devices including a hydraulic cylinder and a multi-plate clutch or brake frictionally engaged depending on an oil pressure supplied to the hydraulic cylinder.

In the automatic transmission 18, the hydraulic friction engagement devices (the clutches C1 to C4, the brakes B1 and B2) are respectively engaged or released in accordance with a predetermined operation table depicted in FIG. 2 to establish shift stages of eight forward speeds and two reverse speeds having respective different gear ratios $\gamma_{AT}$ (=rotation speed $N_{ATIN}$ of the input shaft 20/rotation speed Nout of the output shaft 22) of the automatic transmission 18. In FIG. 2, "○" indicates an engaged state and a blank indicates a released state.

Figure 3:
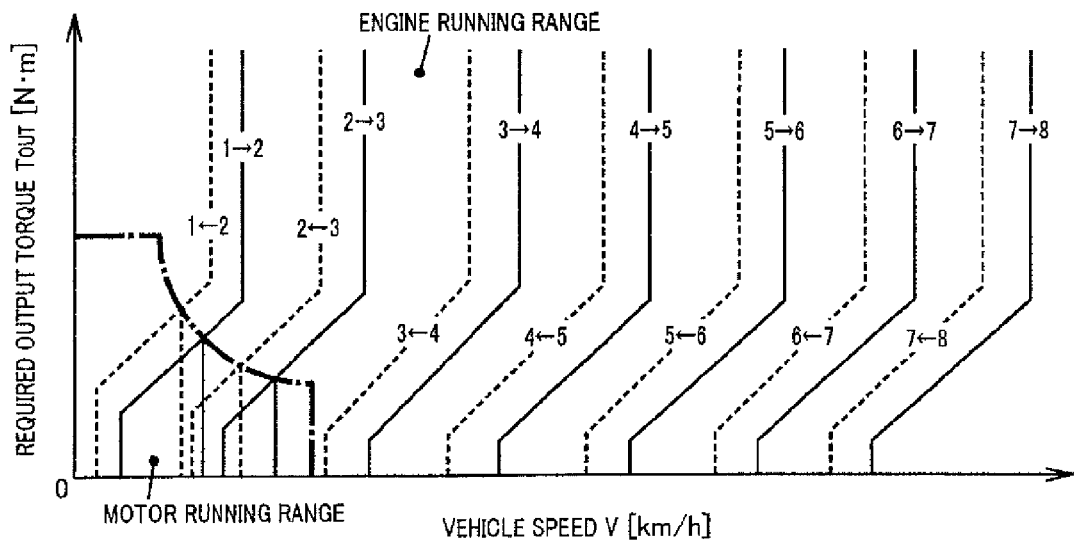
FIG. 3 is a diagram of a shift diagram (shift map) used in automatic shift control of the automatic transmission depicted in FIG. 1.

The automatic shift control of the automatic transmission 18 is provided in accordance with a preliminarily stored shift diagram made up of a plurality of shift lines set within two-dimensional coordinates of a vehicle speed axis and a required output torque axis as depicted in FIG. 3. Specifically, a shift stage to be achieved in the automatic transmission 18 is determined based on a vehicle speed V [km/h] and a required output torque $T_{OUT}$ [N·m] from the shift diagram depicted in FIG. 3 and each of the hydraulic friction engagement devices (the clutches C1 to C4, the brakes B1 and B2) in the automatic transmission 18 is engaged or released in accordance with the operation table depicted in FIG. 2 such that the determined shift stage (gear stage) is established. The engagement or release of the hydraulic friction engagement devices establishes the shift stages of eight forward speeds and two reverse speeds having the respective different gear ratios $\gamma_{AT}$ of the automatic transmission 18. Solid lines of FIG. 3 are shift lines (upshift lines) for determining an upshift and broken lines are shift lines (downshift lines) for determining a downshift. The shift lines in the shift line diagram of FIG. 3 are for the purpose of determining, for example, whether the actual vehicle speed V on a horizontal line indicative of the required output torque $T_{OUT}$ crosses a line or whether the required output torque $T_{OUT}$ on a vertical line indicative of the vehicle speed V crosses a line, i.e., whether the actual vehicle speed V or the required output torque $T_{OUT}$ crosses a value at which a shift should be made (a shift point) on the shift lines, and each of the shift lines is stored in advance as a series of the shift points. Since the required output torque $T_{OUT}$ is a vehicle output torque requested by a driver and the request is made by a depressing operation of an accelerator pedal 50, the vertical axis of FIG. 3 may be switched from the required output torque $T_{OUT}$ to an accelerator opening degree Acc, for example.

The vehicle drive device 10 configured as described above switches and actuates an engine running causing the vehicle to run with the power of the engine 12 and a motor running causing the vehicle to run with the power of the second electric motor MG2, depending on a running state of the vehicle. The switching between the engine running and the motor running is performed based on which of an engine running range and a motor running range sectionalized by a dashed-dotted line in FIG. 3 a running state of the vehicle belongs to.

If the running state of the vehicle belongs to the engine running range in FIG. 3, the torque output from the engine 12 is input via the crankshaft 14 to the torque converter 16 and is amplified by the torque converter 16 and input to the input shaft 20 of the automatic transmission 18. The torque input to the input shaft 20 is changed in speed in the automatic transmission 18 and output from the output shaft 22. As a result, the torque from the engine 12 is transmitted to the drive wheels 58 of the vehicle. If the second electric motor MG2 is driven by using a portion of the output transmitted from the engine 12 to the input shaft 20 in the vehicle drive device 10, the second electric motor MG2 acts as an electric generator to charge the electric storage device 36.

If the running state of the vehicle belongs to the motor running range in FIG. 3, the second electric motor MG2 is supplied with electric power from the electric storage device 36 via the inverter 38 and caused to act as an electric motor, and a torque for vehicle running output from the second electric motor MG2 is input to the input shaft 20 of the automatic transmission 18. The torque input to the input shaft 20 is changed in speed in the automatic transmission 18 and output from the output shaft 22. As a result, the torque from the second electric motor MG2 is transmitted to the drive wheels 58 of the vehicle. In the vehicle drive device 10, since the torque from the drive wheels 58 is used for regeneration by the second electric motor MG2 during decelerated running of the vehicle, the second electric motor MG2 acts as an electric generator to charge the electric storage device 36.

In the vehicle drive device 10, for example, even when the vehicle running state belongs to the motor running range, if a charge remaining amount SOC (state of charge) of the electric storage device 36 is equal to or less than a predetermined value, the engine running is performed. When the vehicle is suddenly started or rapidly accelerated, the control is provided as needed such as using output of both the engine 12 and the second electric motor MG2 for running the vehicle.

Figure 4:
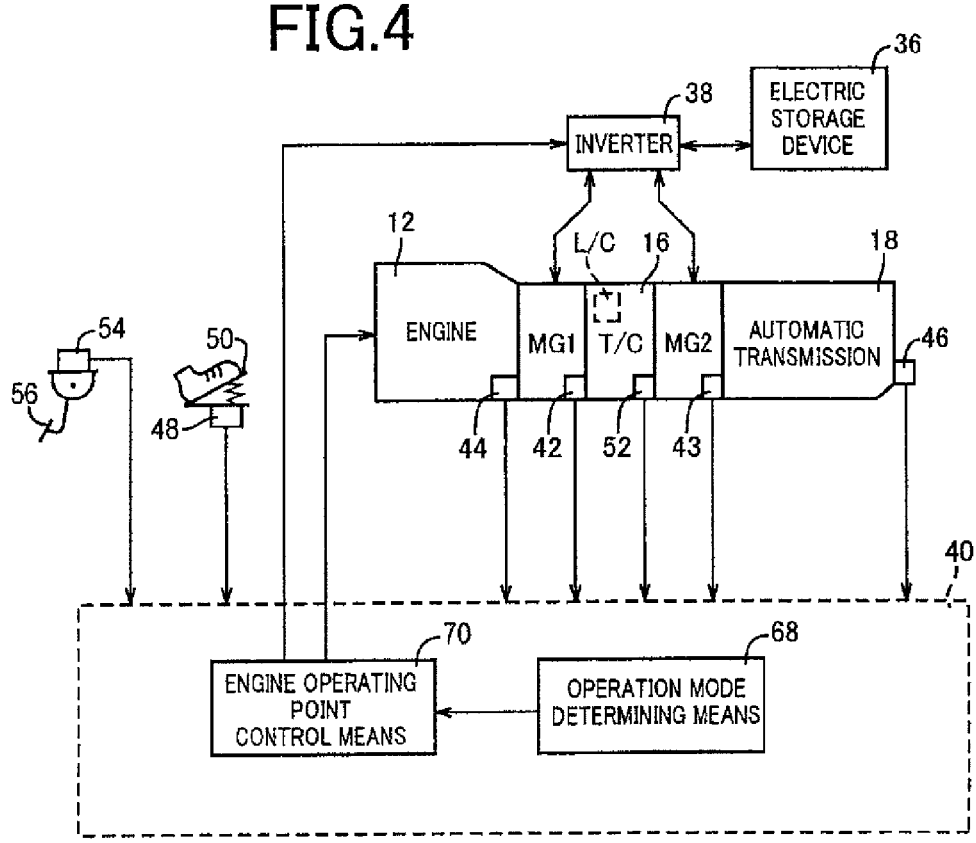
FIG. 4 is a diagram for explaining input signals input from sensors to an electronic control device of a first embodiment for controlling the vehicle drive device of FIG. 1 and is a functional block diagram for explaining a main portion of the control function included in the electronic control device.

FIG. 4 is a diagram for explaining input signals input from sensors to an electronic control device 40 for controlling the vehicle drive device 10 and is a functional block diagram for explaining a main portion of the control function included in the electronic control device 40. In FIG. 4, the electronic control device 40 has a function as a control device of the vehicle drive device 10 and includes a so-called microcomputer equipped with a CPU, a RAM, a ROM, and an input/output interface, and the CPU executes signal processes in accordance with programs stored in advance in the ROM, while utilizing a temporary storage function of the RAM, to provide the output control of the engine 12, the shift control of the automatic transmission 18, and the output control of the electric motors MG1 and MG2, or the like.

The electronic control device 40 is supplied with various input signals detected by sensors depicted in FIG. 4 disposed on the vehicle. The input signals include, for example, a signal indicative of the first electric motor rotation speed $N_{MG1}$ detected by a first electric motor rotation speed sensor 42 that is an MG1 resolver, a signal indicative of the second electric motor rotation speed $N_{MG2}$ detected by a second electric motor rotation speed sensor 43 that is an MG2 resolver, a signal indicative of the engine rotation speed Ne that is a rotation speed of the crankshaft 14 detected by an engine rotation speed sensor 44, a signal indicative of the vehicle speed V corresponding to a rotation speed Nout of the output shaft 22 (hereinafter referred to as an output shaft rotation speed Nout) detected by a vehicle speed sensor 46, a signal indicative of the accelerator opening degree Acc that is an operation amount of the accelerator pedal 50 detected by an accelerator opening degree sensor 48, a signal indicative of the turbine rotation speed Nt detected by a turbine rotation speed sensor 52, and a signal indicative of whether a brake pedal 56 is depressed, detected by a foot brake switch 54.

The electronic control device 40 supplies various output signals to the devices disposed on the vehicle. The output signals include, for example, signals supplied to an ignition device, an electronic throttle valve, etc., for the output control of the engine 12, a signal supplied to the first electric motor MG1 for the output control of the first electric motor MG1, a signal supplied to the second electric motor MG2 for the output control of the second electric motor MG2, and a signal supplied to a solenoid valve etc., in a hydraulic control circuit for the shift control of the automatic transmission 18.

Figure 5:
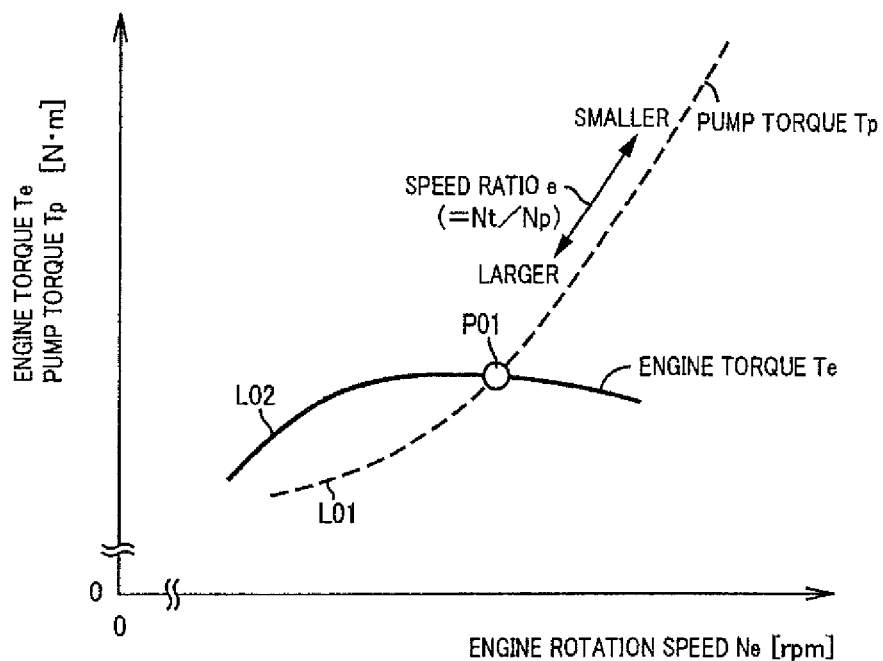
FIG. 5 is a diagram for explaining how the operating point of the engine is determined while the first electric motor and the second electric motor are not actuated in the vehicle drive device of FIG. 1.

FIG. 5 is a diagram for explaining how the operating point of the engine 12 is determined while the first electric motor MG1 and the second electric motor MG2 are not actuated. As depicted in FIG. 5, a pump torque Tp is an input-side load torque Tp generated in the pump impeller (input-side rotating element) 16p depending on a speed ratio e (=Nt/Np) of the torque converter 16 and has relationship with the engine rotation speed Ne as indicated by, for example, a broken line L01, under a certain constant turbine rotation speed Nt. The relationship between the pump torque Tp and the engine rotation speed Ne (=Np) as indicated by the broken line L01 is relationship satisfying an equation "$Tp = \tau \times Ne^2$" when expressed by using a capacitive coefficient r of the torque converter 16, which is a function of the speed ratio e. Therefore, as depicted in FIG. 5, when the engine rotation speed Ne is higher, the speed ratio e of the torque converter 16 is smaller, and when the engine rotation speed Ne is higher, the pump torque Tp is larger. On the other hand, an output torque Te of the engine 12 (hereinafter referred to as an engine torque Te) has relationship with the engine rotation speed Ne as indicated by, for example, a solid line L02, under a certain constant throttle valve opening degree $\theta_{TH}$ of an electronic throttle valve of the engine 12, and the solid line L02 intersects with the broken line L01. An intersection point P01 between the broken line L01 and the solid line L02 indicates a point of balance between the engine torque Te and the pump torque Tp and the intersection point P01 is defined as the operating point of the engine 12. Therefore, the operating point of the engine 12 is passively determined based on the turbine rotation speed Nt and the throttle valve opening degree $\theta_{TH}$. In contrast, in the present embodiment, the operating point of the engine 12 can arbitrarily be changed by providing the output control of the first electric motor MG1 without being constrained by the turbine rotation speed Nt. This can be described with reference to FIG. 6. The operating point of the engine 12 is an operating point indicative of an operating state of the engine 12 represented by the engine rotation speed Ne, the engine torque Te, etc., and is, in other words, an operating state of the engine 12 indicated by one point in two-dimensional coordinates of an axis indicative of the engine rotation speed Ne and an axis indicative of the engine torque Te.

Figure 6:
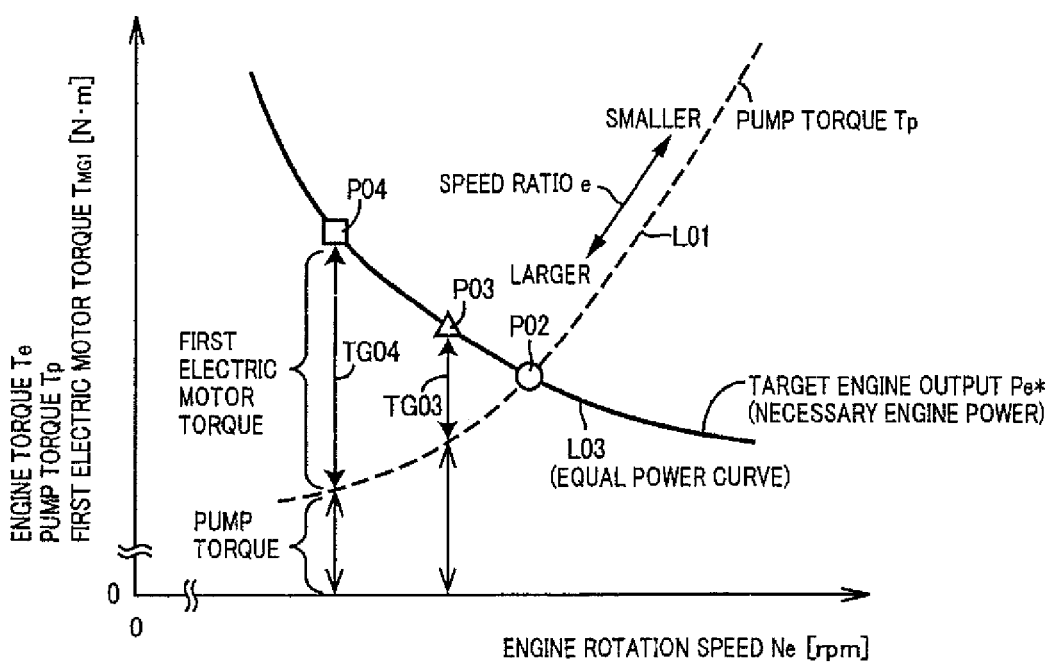
FIG. 6 is a diagram for explaining that the operating point of the engine can arbitrarily be changed by controlling the first electric motor in the vehicle drive device of FIG. 1.

FIG. 6 is a diagram for explaining that the operating point of the engine 12 can arbitrarily be changed by controlling the first electric motor MG1. In FIG. 6, the same reference numerals as FIG. 5 mutually denote the same elements and the turbine rotation speed Nt is assumed to be the same as FIG. 5. A solid line L03 of FIG. 6 is an equal power curve indicative of relationship between the engine rotation speed Ne and the engine torque Te when a necessary engine power Pe*, i.e., a target engine output Pe* serving as a target value of an engine output Pe (e.g., in kW) is set to a constant value and control is provided to achieve convergence to the target engine output Pe*. FIG. 6 depicts an example when the operating point of the engine 12 is arbitrarily set on the equal power curve (solid line L03). In FIG. 6, when the relationship between the pump torque Tp and the engine rotation speed Ne is indicated by the broken line L01 and the engine output Pe is set to the target engine output Pe* indicated by the solid line L03, if an output torque $T_{MG1}$ of the first electric motor MG1 (hereinafter referred to as first electric motor torque $T_{MG1}$) is not generated, the operating point of the engine 12 is a point P02; if the first electric motor MG1 is driven to perform electric generation operation and the first electric motor torque $T_{MG1}$ of TG03 is generated in the negative rotation direction, the operating point of the engine 12 is a point P03; and if the absolute value of the first electric motor torque $T_{MG1}$ is raised and the first electric motor torque $T_{MG1}$ of TG04 is generated in the negative rotation direction, the operating point of the engine 12 is a point P04. In short, in the vehicle drive device 10 of the embodiment, the first electric motor torque $T_{MG1}$ is adjusted such that the sum of the engine torque Te and the first electric motor torque $T_{MG1}$ is balanced with the pump torque Tp, i.e., such that the relationship of "$Tp = Te + T_{MG1}$ ($T_{MG1}$ of FIG. 6 is a negative value)" is satisfied, so as to arbitrarily change the operating point of the engine 12 without being constrained by the turbine rotation speed Nt. If the first electric motor MG1 is driven to perform electric generation operation, electric power generated by the first electric motor MG1 may be stored in the electric storage device 36; however, the electric power is basically supplied to the second electric motor MG2 and the second electric motor MG2 is driven. Therefore, the vehicle drive device 10 includes two power transmission paths, i.e., an electric path through which power (e.g., in kW) is electrically transmitted by giving/receiving electric power between the first electric motor MG1 and the second electric motor MG2 and a mechanical path through which power is mechanically transmitted via the torque converter 16, in parallel with each other between the engine 12 and the drive wheels 58. Since the operating point of the engine 12 can continuously be changed by adjusting the first electric motor torque $T_{MG1}$ without being constrained by the turbine rotation speed Nt as described above, the first electric motor MG1, the second electric motor MG2, and the torque converter 16 can perform continuously variable transmission operation in which a gear ratio (=Ne/Nt) is changed in a substantially stepless manner as a whole and it can be said that a continuously variable transmission 60 is formed.

Figure 7:
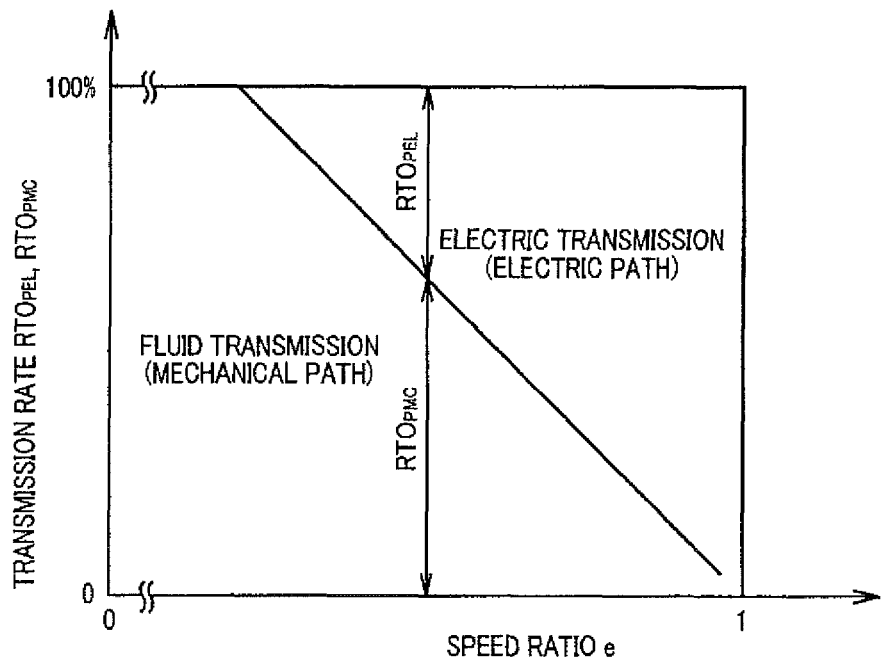
FIG. 7 is a conceptual diagram for explaining a proportion (transmission rate) of power transmitted through each of an electric path and a mechanical path when the operating point of the engine is changed under a certain constant target engine output in the vehicle drive device of FIG. 1.

FIG. 7 is a conceptual diagram for explaining a proportion (transmission rate) of power transmitted through each of the electric path and the mechanical path when the operating point of the engine 12 is changed under a certain constant target engine output Pe*. In FIG. 7, electric transmission represents that the power from the engine 12 is electrically transmitted, and therefore means the power transmission through the electric path, and fluid transmission represents that the power from the engine 12 is transmitted through fluid in the torque converter 16, and therefore means the power transmission through the mechanical path. In FIG. 6, the output control of the first electric motor MG1 is provided such that the first electric motor torque $T_{MG1}$ increases in absolute value in the negative rotation direction as the engine rotation speed Ne becomes lower, i.e., the speed ratio e of the torque converter 16 becomes larger and, therefore, as depicted in FIG. 7, when the speed ratio e becomes larger toward one, a transmission rate $RTO_{PEL}$ of power through the electric transmission becomes larger while a transmission rate $RTO_{PMC}$ of power through the fluid transmission becomes smaller and, specifically, when the speed ratio e is closer to one, the transmission rate $RTO_{PEL}$ of power through the electric transmission becomes closer to 100%. This tendency of change in the transmission rates $RTO_{PEL}$ and $RTO_{PMC}$ relative to the speed ratio e is the same regardless of the target engine output Pe* or the turbine rotation speed Nt.

Figure 8:
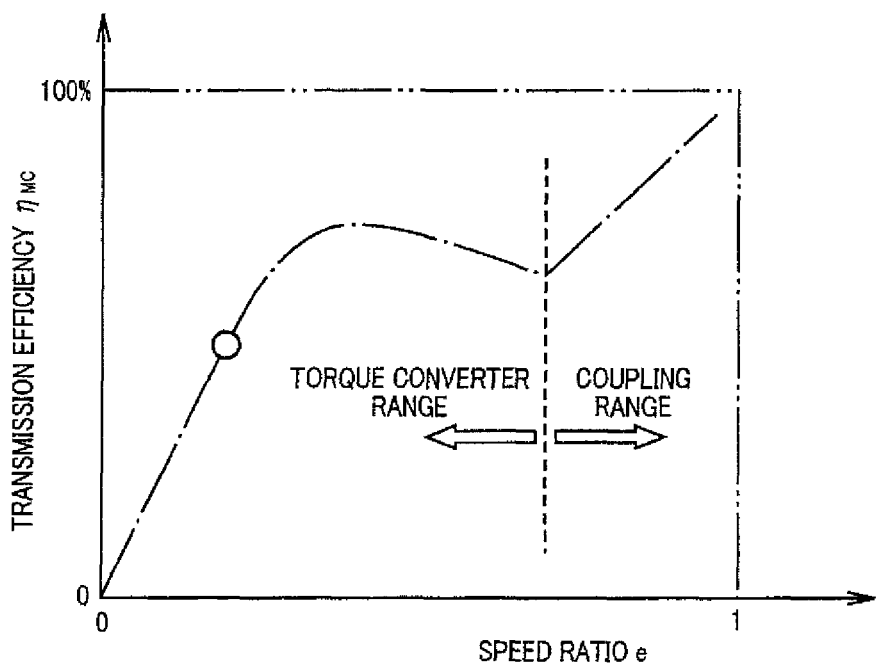
FIG. 8 is a diagram of relationship between transmission efficiency of a torque converter only, i.e., transmission efficiency of the mechanical path and a speed ratio of the torque converter in the vehicle drive device of FIG. 1.

Power transmission efficiency (=output power/input power; also simply referred to as transmission efficiency throughout the description) in the continuously variable transmission 60 made up of the first electric motor MG1, the second electric motor MG2, and the torque converter 16 will be described. First, transmission efficiency $\eta_{MC}$ of the torque converter 16 only, i.e., transmission efficiency $\eta_{MC}$ of the mechanical path, will be described with reference to FIG. 8. As depicted in FIG. 8, in a torque converter range on the side of a smaller speed ratio e, the transmission efficiency $\eta_{MC}$ of the torque converter 16 has a local maximum value at a predetermined speed ratio e and the transmission efficiency $\eta_{MC}$ becomes zero when the speed ratio e is zero. In a coupling range on the side of a larger speed ratio e, the transmission efficiency $\eta_{MC}$ becomes higher when the speed ratio e is larger, and the transmission efficiency $\eta_{MC}$ becomes highest when the speed ratio e is close to one in the torque converter range and the coupling range as a whole. Considering transmission efficiency $\eta_{EL}$ of the electric path and the transmission rates $RTO_{PEL}$ and $RTO_{PMC}$ depicted in FIG. 7 along with the transmission efficiency $\eta_{MC}$ of the torque converter 16, combined transmission efficiency $\eta_{CVT}$ can be obtained that is transmission efficiency in the case of transmitting the power from the engine 12 through the electric path and the mechanical path, i.e., the combined transmission efficiency $\eta_{CVT}$ of the entire continuously variable transmission 60.

Figure 9:
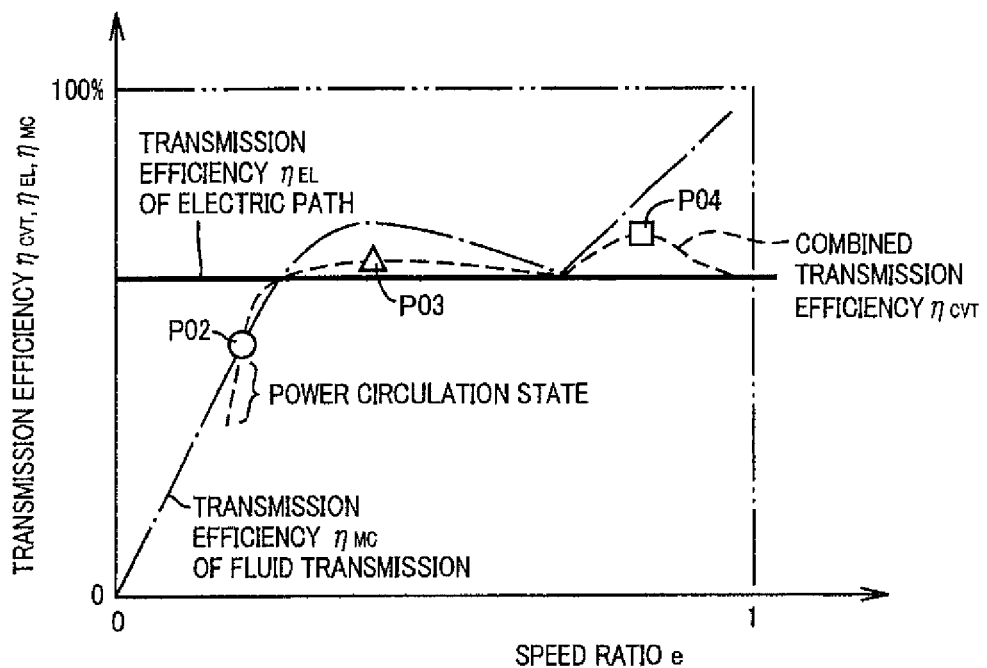
FIG. 9 is a diagram of relationship between combined transmission efficiency $\eta_{CVT}$ and the speed ratio of the torque converter in the vehicle drive device of FIG. 1.

FIG. 9 is a diagram of relationship between the combined transmission efficiency $\eta_{CVT}$ and the speed ratio e of the torque converter 16. In FIG. 9, a dashed-dotted line indicative of the transmission efficiency $\eta_{MC}$ of the mechanical path (fluid transmission) is the same as that of FIG. 8. As depicted in a solid line of FIG. 9, the transmission efficiency $\eta_{EL}$ of the electric path (electric transmission) is almost unchanged even when the speed ratio e of the torque converter 16 is changed, as compared to the transmission efficiency $\eta_{MC}$ of the mechanical path (fluid transmission). If the power from the engine 12 is transmitted through both the mechanical path and the electric path at the transmission rates $RTO_{PEL}$ and $RTO_{PMC}$ as depicted in FIG. 7 depending on the speed ratio e, the combined transmission efficiency $\eta_{CVT}$ is changed as indicated by a broken line in accordance with the speed ratio e. The points P02, P03, and P04 of FIG. 9 are the points P02, P03, and P04, respectively, of FIG. 6 expressed on the coordinate system of FIG. 9 and, in the case of FIG. 9, the combined transmission efficiency $\eta_{CVT}$ becomes highest at the speed ratio e indicated by the point P04 among the three points P02, P03, and P04. In FIG. 9, in a range of the speed ratio e lower than the speed ratio e indicated by the point P02, the combined transmission efficiency $\eta_{CVT}$ indicated by a broken line is significantly reduced lower than the transmission efficiency $\eta_{MC}$ of the mechanical path, and this is because the electric power transmission state between the first electric motor MG1 and the second electric motor MG2 turns to a power circulation state in which the first electric motor MG1 consumes electric power while the second electric motor MG2 generates electricity, or in other words, a power circulation state in which power is electrically transmitted from the second electric motor MG2 to the first electric motor MG1.

Since the vehicle drive device 10 can continuously change the operating point of the engine 12 by adjusting the first electric motor torque $T_{MG1}$ without being constrained by the turbine rotation speed Nt as described above, this embodiment utilizes this function, i.e., the continuously variable transmission function of the continuously variable transmission 60 to provide control for efficiently activating the engine 12 and, moreover, for allowing the vehicle drive device 10 including the engine 12 to efficiently operate as a whole. A main portion of the control function will hereinafter be described.

Returning to FIG. 4, as depicted in FIG. 4, the electronic control device 40 includes an operation mode determining means 68 as an operation mode determining portion, and an engine operating point control means 70 as an engine operating point control portion.

The operation mode determining means 68 determines whether a predetermined system optimum operation mode is selected. For example, if an operation mode switch is turned on that is a switch switched on when a driver selects the system optimum operation mode, the operation mode determining means 68 determines that the system optimum operation mode is selected. The system optimum operation mode is an operation mode for achieving efficiency improvement in the engine 12 and the continuously variable transmission 60 as a whole rather than efficiently activating only the engine 12, and is selected when it is desired to give very high priority to the fuel efficiency improvement, for example. The system optimum operation mode may automatically be selected, for example, when the accelerator opening degree Acc is almost unchanged, instead of depending on switching of the operation mode switch.

Figure 10:
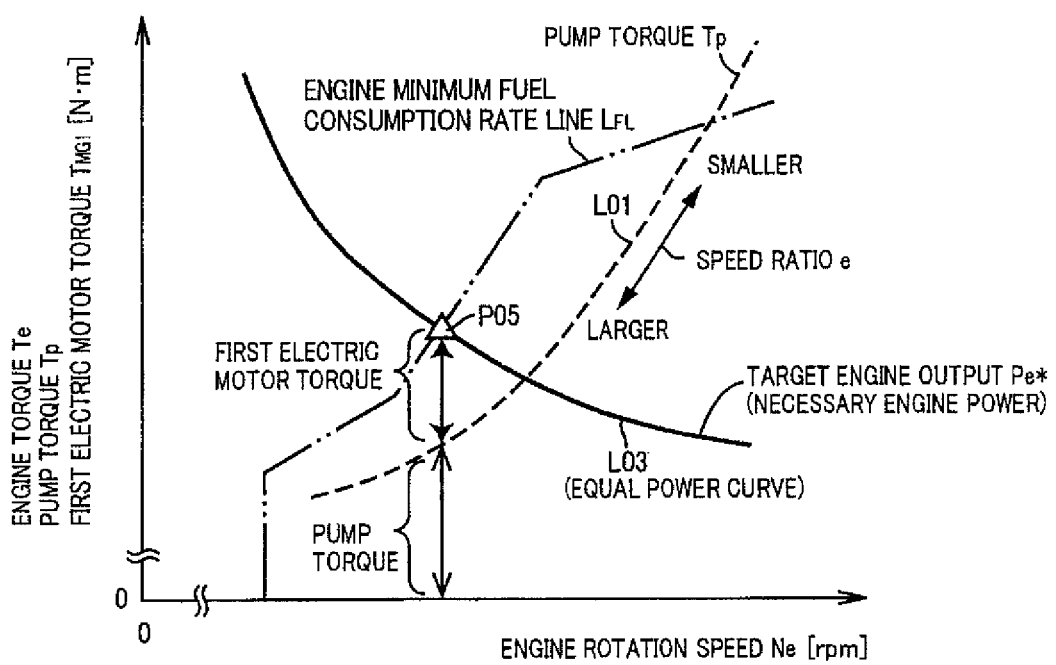
FIG. 10 is a diagram of a first electric motor torque and a pump torque when an operating point on an engine minimum fuel consumption rate line is set as a target engine operating point at a certain turbine rotation speed in the same coordinate system as FIG. 6.

The engine operating point control means 70 provides an engine operating point control in which the first electric motor torque $T_{MG1}$ is adjusted to control the operating point of the engine 12 during the engine running. When the first electric motor torque $T_{MG1}$ is adjusted, specifically, as depicted in FIG. 6, the first electric motor torque $T_{MG1}$ is adjusted such that the sum of the engine torque Te and the first electric motor torque $T_{MG1}$ is balanced with the pump torque Tp that is the input-side load torque of the torque converter 16. Since the engine operating point control means 70 basically causes the first electric motor MG1 to perform the electric generation operation in the engine operating point control, the first electric motor torque $T_{MG1}$ is a negative value except the power circulation state. Specifically describing the engine operating point control, first, the engine operating point control means 70 sequentially determines the target engine operating point as an operating point P05 of the engine 12 at which the target engine output Pe* is achieved on an engine minimum fuel consumption rate line $L_{FL}$ determined in advance as depicted in FIG. 10. FIG. 10 is a diagram of the first electric motor torque $T_{MG1}$ and the pump torque Tp when an operating point on the engine minimum fuel consumption rate line $L_{FL}$ is defined as the target engine operating point in the coordinate system same as FIG. 6 under a certain constant turbine rotation speed Nt, and the broken line L01 and the solid line L03 in FIG. 10 are the same as those of FIG. 6. The engine minimum fuel consumption rate line $L_{FL}$ is an operating curve of the engine 12 indicative of relationship between the engine rotation speed Ne and the engine torque Te empirically determined in advance such that the fuel consumption rate of the engine 12 is minimized, or in other words, is a series of fuel efficiency optimum points that are operating points optimal for the fuel efficiency improvement of the engine 12. The target engine output (necessary engine power) Pe* is an output requested by a driver to a vehicle and is sequentially determined by the engine operating point control means 70 based on the accelerator opening degree Acc and the vehicle speed V from relationship empirically determined in advance so as to accommodate the output request from the driver and, for example, the target engine output Pe* is determined to be larger when the accelerator opening degree Acc is larger. If the charge remaining amount SOC of the electric storage device 36 is reduced to a predetermined lower limit value or lower, a charge request is made to indicate that the electric storage device 36 should be charged and, preferably, for the target engine output Pe*, an electric power based on the charge request (required charging power) is added to a calculation value based on the accelerator opening degree Acc and the vehicle speed V.

After determining the target engine operating point (point P05) on the engine minimum fuel consumption rate line $L_{FL}$ as described above, the engine operating point control means 70 calculates the pump torque Tp based on the engine rotation speed Ne indicated by the point P05 and calculates the first electric motor torque $T_{MG1}$ based on the pump torque Tp and the engine torque Te indicated by the point P05 as depicted in FIG. 10. The engine operating point control means 70 then calculates the speed ratio e of the torque converter 16 from the engine rotation speed Ne indicated by the point P05 and the turbine rotation speed Nt. The pump torque Tp may be calculated from the capacitive coefficient τ and the engine rotation speed Ne after obtaining the capacitive coefficient r of the torque converter 16 based on the speed ratio e, or may be calculated from a pump torque map in which the relationship between the engine rotation speed Ne and the pump torque Tp as indicated by the broken line L01 of FIG. 10 is empirically obtained depending on the turbine rotation speed Nt.

After calculating the pump torque Tp and the first electric motor torque $T_{MG1}$ based on the target engine operating point (point P05) on the engine minimum fuel consumption rate line $L_{FL}$, since the transmission rate $RTO_{PMC}$ of the mechanical path and the transmission rate $RTO_{PEL}$ of the electric path are respectively obtained from a mechanical path output transmitted through the mechanical path and an electric path output transmitted through the electric path, the engine operating point control means 70 can calculate the combined transmission efficiency $\eta_{CVT}$ based on the speed ratio e and the transmission rates $RTO_{PEL}$ and $RTO_{PMC}$ from the relationship between the speed ratio e and the transmission efficiency $\eta_{MC}$ of the mechanical path empirically obtained and set in advance and the relationship between the speed ratio e and the transmission efficiency $\eta_{EL}$ of the electric path empirically obtained and set in advance, as depicted in FIG. 9. Therefore, the engine operating point control means 70 sequentially calculates the combined transmission efficiency $\eta_{CVT}$.

Along with the calculation of the combined transmission efficiency $\eta_{CVT}$, the engine operating point control means 70 sequentially calculates engine efficiency $\eta_{ENG}$ based on the engine rotation speed Ne and the engine torque Te indicated by the target engine operating point (point P05) on the engine minimum fuel consumption rate line $L_{FL}$, from a relationship (engine efficiency map) empirically obtained and determined in advance between the operating point of the engine 12, which is indicated by the engine rotation speed Ne and the engine torque Te, and the engine efficiency $\eta_{ENG}$. The engine operating point control means 70 also sequentially calculates combined efficiency $\eta_{TOTAL}$, i.e., total efficiency $\eta_{TOTAL}$, acquired as the product of the calculated combined transmission efficiency $\eta_{CVT}$ and the engine efficiency $\eta_{ENG}$. The engine efficiency $\eta_{ENG}$ is a proportion of heat quantity of a lower heating value converted into work when fuel supplied to the engine 12 is completely combusted.

The engine operating point control means 70 switches details of control in the engine operating point control depending on determination of the operation mode determining means 68.

Specifically, if the operation mode determining means 68 determines that the system optimum operation mode is selected, the engine operating point control means 70 shifts the operating point of the engine 12 to the side of greater total efficiency $\eta_{TOTAL}$ that is the product of the combined transmission efficiency $\eta_{CVT}$ and the engine efficiency $\eta_{ENG}$. In other words, since the operating point of the engine 12 is controlled to be identical to the target engine operating point, the target engine operating point is shifted to the side of greater total efficiency $\eta_{TOTAL}$. In this case, the target engine operating point is permitted to be out of the engine minimum fuel consumption rate line $L_{FL}$. The target engine operating point is shifted on the equal power curve (e.g., the solid line L03 of FIG. 10) while the target engine output Pe* is maintained. Therefore, when shifting the target engine operating point, if the engine operating point control means 70 shifts the engine rotation speed Ne indicated by the target engine operating point, the engine torque Te indicated by the target engine operating point is shifted together.

For example, when shifting the target engine operating point to the side of greater total efficiency $\eta_{TOTAL}$ as described above, the engine operating point control means 70 gradually shifts the target engine operating point on the equal power curve indicative of the target engine output Pe* and sequentially calculates the first electric motor torque $T_{MG1}$ as well as the total efficiency $\eta_{TOTAL}$ based on the target engine operating point each time the target engine operating point is shifted. The target engine operating point at the local maximum (preferably the maximum) of the total efficiency $\eta_{TOTAL}$ is determined as the final target engine operating point. When the target engine operating point is gradually shifted on the equal power curve, for example, a new target engine operating point (referred to as "current target engine operating point") is determined as a target engine operating point on the equal power curve acquired by increasing (or "decreasing") the engine rotation speed Ne indicated by a target engine operating point at which the total efficiency $\eta_{TOTAL}$ is calculated (referred to as "previous target engine operating point") by a predetermined change amount ΔNe, and the total efficiency $\eta_{TOTAL}$ is sequentially calculated based on the current target engine operating point. Each time the total efficiency $\eta_{TOTAL}$ is calculated, the total efficiency $\eta_{TOTAL}$ based on the previous target engine operating point is compared with the total efficiency $\eta_{TOTAL}$ based on the current target engine operating point and, as a result, the target engine operating point at the local maximum of the total efficiency $\eta_{TOTAL}$ is obtained. Each time the target engine operating point is shifted, the calculation of the first electric motor torque $T_{MG1}$ and the total efficiency $\eta_{TOTAL}$ is performed in the same way as the calculation of the first electric motor torque $T_{MG1}$ and the total efficiency $\eta_{TOTAL}$ based on the target engine operating point (point P05 of FIG. 10) described above. The change amount ΔNe is empirically determined to a proper level by considering that a too-small change amount ΔNe makes the number of calculations until the local maximum of the total efficiency $\eta_{TOTAL}$ too large while a too-large change amount ΔNe reduces accuracy of the target engine operating point at the local maximum of the total efficiency $\eta_{TOTAL}$.

On the other hand, if the operation mode determining means 68 determines that the system optimum operation mode is not selected, the engine operating point control means 70 does not shift the target engine operating point to the side of greater total efficiency $\eta_{TOTAL}$ from the engine minimum fuel consumption rate line $L_{FL}$ as described above and determines the target engine operating point on the engine minimum fuel consumption rate line $L_{FL}$ (point P05 of FIG. 10) as the final target engine operating point.

If the operation mode determining means 68 determines that the system optimum operation mode is selected or that the system optimum operation mode is not selected, when the final target engine operating point is determined, the engine operating point control means 70 sequentially sets the engine rotation speed Ne and the engine torque Te indicated by the final target engine operating point as target values, i.e., a target engine rotation speed Ne* and a target engine torque Te*, respectively, and also sets the first electric motor torque $T_{MG1}$ and the first electric motor rotation speed $N_{MG1}$ (=engine rotation speed Ne) corresponding to the final target engine operating point as target values, i.e., a target first electric motor torque $T_{MG1}$* and a target first electric motor rotation speed $N_{MG1}$*, respectively. The engine operating point control means 70 adjusts the throttle valve opening degree $\theta_{TH}$ to provide the output control of the engine 12 such that the actual engine torque Te matches, for example, follows, the target engine torque Te* and also controls the first electric motor MG1 such that the actual first electric motor torque $T_{MG1}$ matches (follows) the target first electric motor torque $T_{MG1}$* and that the actual first electric motor rotation speed $N_{MG1}$ matches (follows) the target first electric motor rotation speed $N_{MG1}$*. As described above, the engine operating point control means 70 provides the engine operating point control.

Matching the actual first electric motor rotation speed $N_{MG1}$ with the target first electric motor rotation speed $N_{MG1}$* corresponds to matching the actual engine rotation speed Ne with the target engine rotation speed Ne*.

If the operation mode determining means 68 determines that the system optimum operation mode is not selected, the engine operating point control means 70 controls the engine 12 and the first electric motor MG1 such that the actual engine rotation speed Ne and engine torque Te match the target engine rotation speed Ne* and the target engine torque Te*, respectively, corresponding to the target engine operating point (P05 of FIG. 10) achieving the target engine output Pe* on the engine minimum fuel consumption rate line $L_{FL}$ and, therefore, it can be said that the engine operating point control means 70 controls the operating point of the engine 12 such that the operating point of the engine 12 is located along the engine minimum fuel consumption rate line $L_{FL}$ while the target engine output Pe* is achieved.

The engine operating point control means 70 may calculate the total efficiency $\eta_{TOTAL}$ of the vehicle drive device 10 based on the target engine operating point (point P05 of FIG. 10) on the engine minimum fuel consumption rate line $L_{FL}$ regardless of the determination of the operation mode determining means 68 or when the operation mode determining means 68 determines that the system optimum operation mode is selected.

The engine operating point control means 70 transmits an output torque $T_{MG2}$ of the second electric motor MG2 (hereinafter referred to as second electric motor torque $T_{MG2}$) to the drive wheels 58 in the engine operating point control. Although the engine operating point control means 70 basically supplies electric power generated by the first electric motor MG1 directly to the second electric motor MG2 to drive the second electric motor MG2 in this case, if the charge request is made, the engine operating point control means 70 calculates the target engine output Pe* increased by the required charging power to be stored in the electric storage device 36 in accordance with the charge request and supplies to the second electric motor MG2 a remaining portion of the electric power generated by the first electric motor MG1 after subtracting the electric power to be stored into the electric storage device 36, thereby driving the second electric motor MG2. Since the engine operating point control causes all or a portion of the electric power generated by the first electric motor MG1 to be consumed by the second electric motor MG2, the second electric motor torque $T_{MG2}$ is a torque corresponding to the first electric motor torque $T_{MG1}$ and, if the consumed electric power in the second electric motor MG2 is suppressed, the first electric motor torque $T_{MG1}$ is indirectly suppressed in this relationship. Therefore, in the engine operating point control, the adjustment of the first electric motor torque $T_{MG1}$ may be considered as the adjustment of the power transmitted through the electric path and as the adjustment of the second electric motor torque $T_{MG2}$.

Figure 11:
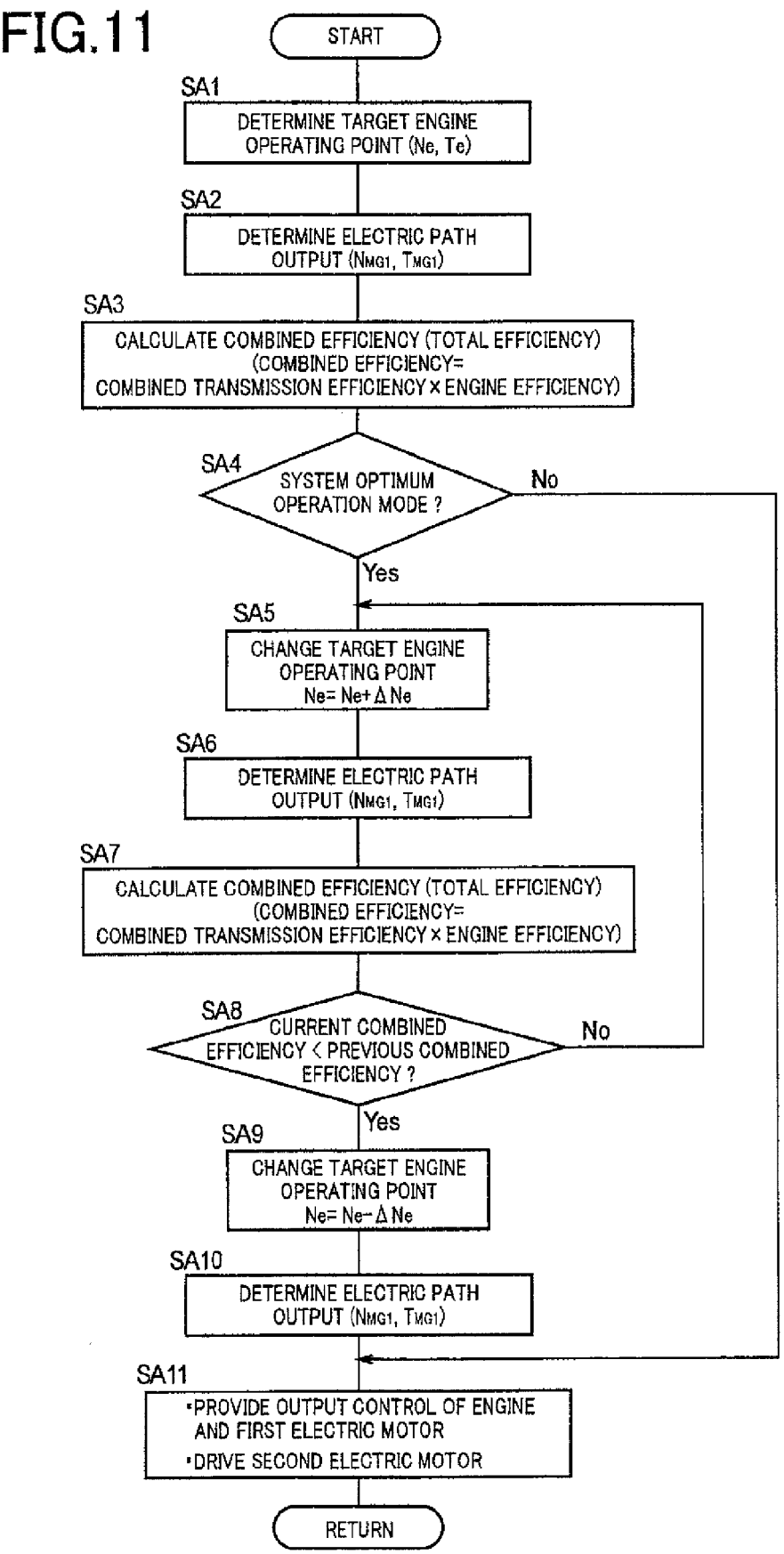
FIG. 11 is a flowchart in the first embodiment for explaining a main portion of the control operation of the electronic control device of FIG. 4, i.e., the control operation of determining the operating point of the engine by utilizing a continuously variable transmission operation of a continuously variable transmission.

FIG. 11 is a flowchart for explaining a main portion of the control operation of the electronic control device 40, i.e., the control operation of determining the operating point of the engine 12 by utilizing the continuously variable transmission operation of the continuously variable transmission 60 and is repeatedly executed with an extremely short cycle time, for example, on the order of few msec to a few tens of msec. The control operation depicted in FIG. 11 is performed solely or concurrently with another control operation. Steps (hereinafter, "step" will be omitted) SA1 to SA3 and SA5 to SA11 correspond to the engine operating point control means 70 and SA4 corresponds to the operation mode determining means 68.

First, at SA1, a target engine output (necessary engine power) Pe* is calculated based on the accelerator opening degree Acc and the vehicle speed V from a predetermined relationship. The target engine output Pe* may be calculated to be larger by the charging power if the electric storage device 36 is charged, or may be calculated to be smaller by the discharging power if the electric storage device 36 is discharged. At SA1, a target engine operating point is determined as an operating point (e.g., the point P05 of FIG. 10) of the engine 12 at which the calculated target engine output Pe* is achieved on the engine minimum fuel consumption rate line $L_{FL}$ as depicted in FIG. 10. SA1 is followed by SA2.

At SA2, as exemplarily illustrated in FIG. 10, the first electric motor torque $T_{MG1}$ is calculated and determined based on the target engine operating point (e.g., the point P05) determined at SA1. In other words, the electric path output (e.g., in kW) transmitted through the electric path corresponding to the target engine operating point is calculated based on the first electric motor torque $T_{MG1}$ and the first electric motor rotation speed $N_{MG1}$ (=engine rotation speed Ne). The mechanical path output (e.g., in kW) transmitted through the mechanical path corresponding to the target engine operating point is calculated based on the pump torque Tp and the pump rotation speed Np (=engine rotation speed Ne). SA2 is followed by SA3.

At SA3, the combined transmission efficiency $\eta_{CVT}$ based on the target engine operating point determined at SA1 is calculated from the relationship between each of the transmission efficiency $\eta_{MC}$ of the mechanical path and the transmission efficiency $\eta_{EL}$ of the electric path, and the speed ratio e as depicted in FIG. 9 based on the turbine rotation speed Nt detected by the turbine rotation speed sensor 52, the engine rotation speed Ne indicated by the target engine operating point, and the electric path output and the mechanical path output calculated at SA2. The engine efficiency $\eta_{ENG}$ based on the target engine operating point determined at SA1 is also calculated. The product of the combined transmission efficiency $\eta_{CVT}$ and the engine efficiency $\eta_{ENG}$ is calculated as the total efficiency (combined efficiency) $\eta_{TOTAL}$. SA3 is followed by SA4.

At SA4, it is determined whether the system optimum operation mode is selected. If the determination at SA4 is affirmative, i.e., if the system optimum operation mode is selected, the operation goes to SA5. On the other hand, if the determination at SA4 is negative, the operation goes to SA11.

At SA5, the engine rotation speed Ne indicated by the target engine operating point is increased by the change amount ΔNe set in advance to determine a new target engine operating point. This stepwise change in the target engine operating point is made such that the target engine output Pe* calculated at SA1 is not changed. Therefore, the engine torque Te indicated by the target engine operating point is changed along with the change in the engine rotation speed Ne indicated by the target engine operating point. The target engine operating point before the change at SA5 is referred to as a previous target engine operating point and the target engine operating point after the change is referred to as a current target engine operating point. SA5 is followed by SA6.

At SA6, as is the case with SA2, the first electric motor torque $T_{MG1}$ is calculated based on the current target engine operating point, and the electric path output and the mechanical path output corresponding to the current target engine operating point are calculated. SA6 is followed by SA7.

At SA7, as is the case with SA3, the combined transmission efficiency $\eta_{CVT}$ based on the current target engine operating point is calculated and the engine efficiency $\eta_{ENG}$ based on the current target engine operating point is calculated. The product of the combined transmission efficiency $\eta_{CVT}$ and the engine efficiency $\eta_{ENG}$ is calculated as the total efficiency (combined efficiency) $\eta_{TOTAL}$ (referred to as current combined efficiency). Previous combined efficiency, i.e., the total efficiency (combined efficiency) $\eta_{TOTAL}$ based on the previous target engine operating point, is stored in advance for determination at SA8. SA7 is followed by SA8.

At SA8, it is determined whether the previous combined efficiency is greater than the current combined efficiency. If the determination at SA8 is affirmative, i.e., if the previous combined efficiency is greater than the current combined efficiency, the operation goes to SA9. On the other hand, if the determination at SA8 is negative, the operation goes to SA5.

At SA9, the target engine operating point is returned to the previous target engine operating point. In other words, the engine rotation speed Ne indicated by the current target engine operating point determined at SA5 is reduced by the predetermined change amount ΔNe to determine a new target engine operating point. In this case, as is the case with SA5, the engine torque Te indicated by the target engine operating point is also changed, i.e., returned to the previous torque, such that the target engine output Pe* is not changed. SA9 is followed by SA10.

At SA10, as is the case with SA2, the first electric motor torque $T_{MG1}$ is calculated based on the target engine operating point newly determined at SA9, and the electric path output and the mechanical path output corresponding to the target engine operating point newly determined at SA9 are calculated. SA10 is followed by SA11.

At SA11, the output control of the engine 12 and the first electric motor MG1 is provided such that an actual operating point of the engine 12 indicated by the actual engine rotation speed Ne and engine torque Te matches, for example, follows, the finally determined target engine operating point. The second electric motor torque $T_{MG2}$ is transmitted to the drive wheels 58. Although the electric power generated by the first electric motor MG1 is directly supplied to the second electric motor MG2 to drive the second electric motor MG2 in this case, if the electric storage device 36 is charged, the second electric motor MG2 is supplied with a remaining portion of the electric power generated by the first electric motor MG1 after subtracting the electric power to be stored into the electric storage device 36, so as to drive the second electric motor MG2.

This embodiment has the following effects (A1) to (A4).

(A1) According to this embodiment, the first electric motor MG1, the second electric motor MG2, and the torque converter 16 make up the continuously variable transmission 60 as a whole and the engine operating point control means 70 provides the engine operating point control in which the first electric motor torque $T_{MG1}$ is adjusted to control the operating point of the engine 12 during the engine running. In the engine operating point control, the second electric motor torque $T_{MG2}$ is transmitted to the drive wheels 58. Therefore, since the continuously variable transmission operation of the continuously variable transmission 60 can be performed by adjusting the first electric motor torque $T_{MG1}$ (basically, regenerative torque) and the continuously variable transmission operation of the continuously variable transmission 60 enables the operating point of the engine 12 to be controlled without being constrained by the turbine rotation speed Nt, the engine 12 can be driven at an operating point optimal for the fuel efficiency improvement (fuel efficiency optimum point), for example, and the vehicle fuel efficiency can be improved.

(A2) According to this embodiment, as depicted in FIG. 6, the engine operating point control means 70 adjusts the first electric motor torque $T_{MG1}$ so that the sum of the engine torque Te and the first electric motor torque $T_{MG1}$ is balanced with the pump torque Tp that is the input-side load torque of the torque converter 16. Therefore, the first electric motor torque $T_{MG1}$ can easily be adjusted based on the characteristics of the torque converter 16.

(A3) According to this embodiment, if the operation mode determining means 68 determines that the system optimum operation mode is selected, the engine operating point control means 70 shifts the operating point of the engine 12 to the side of greater total efficiency $\eta_{TOTAL}$ that is the product of the combined transmission efficiency $\eta_{CVT}$ and the engine efficiency $\eta_{ENG}$. Therefore, as compared to the case that the operating point of the engine 12 is not changed depending on the total efficiency $\eta_{TOTAL}$, the efficiency of the vehicle drive device 10 is increased as a whole and the vehicle fuel efficiency can be improved.

(A4) According to this embodiment, if the operation mode determining means 68 determines that the system optimum operation mode is not selected, the engine operating point control means 70 controls the operating point of the engine 12 such that the operating point of the engine 12 is located along the engine minimum fuel consumption rate line $L_{FL}$ and that the target engine output Pe* is achieved. Therefore, a rise in the fuel consumption rate of the engine 12 can be suppressed by the continuously variable transmission operation of the continuously variable transmission 60.

Other embodiments of the present invention will be described. In the description of the following embodiments, the mutually overlapping portions of the embodiments are denoted by the same reference numerals and will not be described.

Second Embodiment

In this embodiment, as is the case with the first embodiment, the operating point of the engine 12 is controlled by adjusting the first electric motor torque $T_{MG1}$; however, a difference from the first embodiment is that consideration is given to the gear ratio $\gamma_{AT}$ of the automatic transmission 18, or specifically, the shift stage of the automatic transmission 18. First, it will be described that the combined transmission efficiency $\eta_{CVT}$ can be changed by a shift of the automatic transmission 18 under a certain constant operating point of the engine 12 with reference to FIGS. 12 to 14. The following description is based on the details of the first embodiment and the points different from the first embodiment will mainly be described without describing the points of this embodiment common with the first embodiment.

Figure 12:
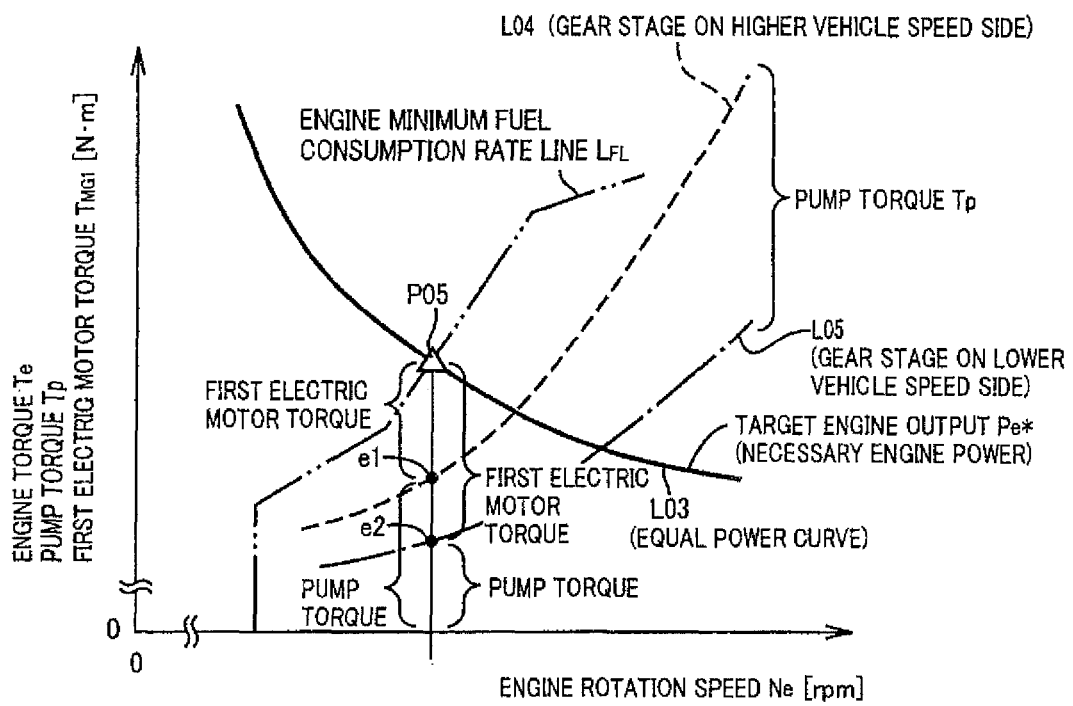
FIG. 12 is a diagram of the first electric motor torque and the pump torque of each gear stage of the automatic transmission when the operating point P05 on the engine minimum fuel consumption rate line is defined as the target engine operating point under a certain constant vehicle speed in the coordinate system same as FIG. 10.

FIG. 12 is a diagram of the first electric motor torque $T_{MG1}$ and the pump torque Tp of each gear stage of the automatic transmission 18 when the operating point P05 on the engine minimum fuel consumption rate line $L_{FL}$ is defined as the target engine operating point in the coordinate system same as FIG. 10 under a certain constant vehicle speed V, and the solid line L03, the engine minimum fuel consumption rate line $L_{FL}$, and the point P05 of FIG. 12 are the same as those of FIG. 10. Although both a broken line L04 and a dashed-dotted line L05 of FIG. 12 are curves representative of relationship between the pump torque Tp and the engine rotation speed Ne, the broken line L04 represents the relationship when the gear stage of the automatic transmission 18 is a gear stage on the higher vehicle speed side as compared to the dashed-dotted line L05. The reason why the pump torque Tp indicated by the broken line L04 becomes larger than the dashed-dotted line LOS as depicted is that when the gear stage of the automatic transmission 18 is on the higher vehicle speed side, the turbine rotation speed Nt becomes lower while the speed ratio e of the torque converter 16 becomes smaller and, therefore, the capacitive coefficient corresponding to the broken line L04 of a gear stage on the higher vehicle speed side becomes larger than the capacitive coefficient τ corresponding to the dashed-dotted line L05 of a gear stage on the lower vehicle speed side when compared at the same engine rotation speed Ne.

As depicted in FIG. 12, since the relationship between the pump torque Tp and the engine rotation speed Ne can be changed stepwise for each gear stage of the automatic transmission 18, even when the target engine operating point is determined as the point P05, the relationship between the pump torque Tp and the engine rotation speed Ne can be switched for each gear stage of the automatic transmission 18 to change a proportion between the pump torque Tp and the first electric motor torque $T_{MG1}$ relative to the engine rotation speed Ne indicated by the point P05. For example, if a gear stage of the automatic transmission 18 corresponding to the broken line L04 is selected in FIG. 12, the speed ratio e based on the point P05 serving as the target engine operating point is e1, and if a gear stage of the automatic transmission 18 corresponding to the dashed-dotted line L05 is selected, the speed ratio e based on the point P05 is e2 (e1<e2). The absolute value of the first electric motor torque $T_{MG1}$ calculated based on the point P05 is smaller when calculated from the broken line L04 as compared to when calculated from the dashed-dotted line L05. Since a proportion between the pump torque Tp and the first electric motor torque $T_{MG1}$ is changed depending on a gear stage of the automatic transmission 18 in this way, the transmission rate $RTO_{PEL}$ of the electric path and the transmission rate $RTO_{PMC}$ of the mechanical path are also changed depending on a gear stage of the automatic transmission 18. This will be described with reference to FIG. 13.

Figure 13:
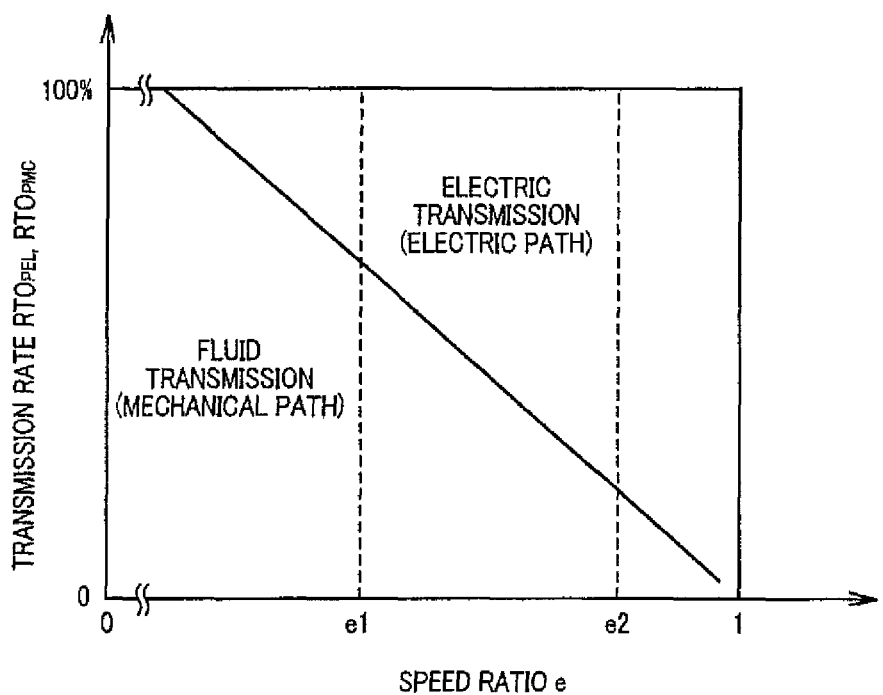
FIG. 13 is a conceptual diagram similar to FIG. 7 and is a diagram for explaining that a transmission rate of the electric path and a transmission rate of the mechanical path are changed depending on a gear stage of the automatic transmission.

FIG. 13 is a conceptual diagram similar to FIG. 7 and is a diagram for explaining that the transmission rate $RTO_{PEL}$ of the electric path and the transmission rate $RTO_{PMC}$ of the mechanical path are changed depending on a gear stage of the automatic transmission 18. As depicted in FIG. 13, the transmission rate $RTO_{PEL}$ of the electric path at the speed ratio e1 corresponding to the broken line L04 of FIG. 12 is smaller than the transmission rate $RTO_{PEL}$ of the electric path at the speed ratio e2 corresponding to the dashed-dotted line L05 of FIG. 12 while the transmission rate $RTO_{PMC}$ of the mechanical path at the speed ratio e1 is larger than the transmission rate $RTO_{PMC}$ of the mechanical path at the speed ratio e2.

Figure 14:
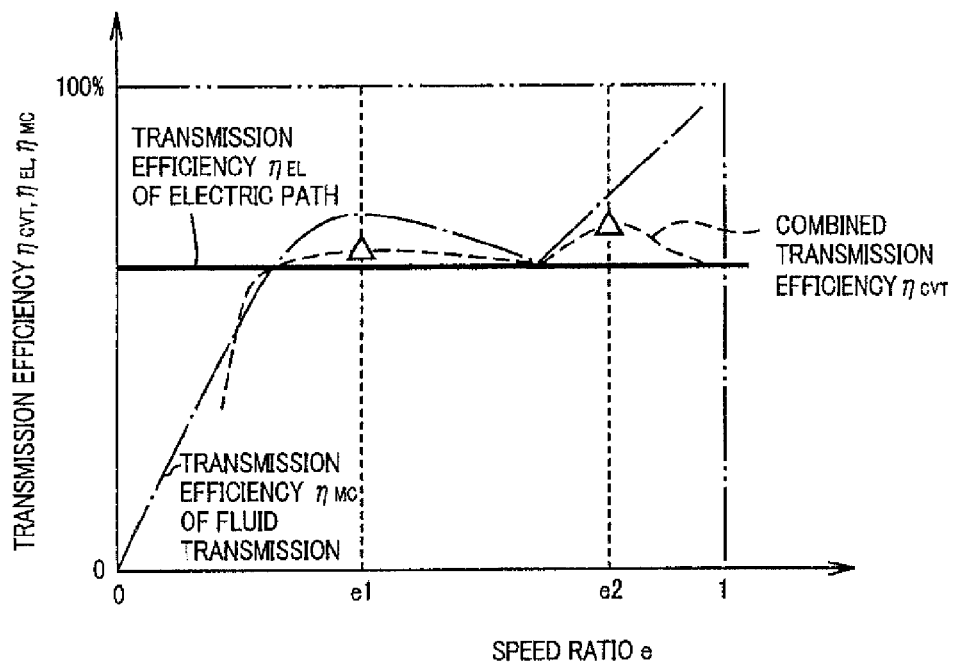
FIG. 14 is a diagram of relationship between the combined transmission efficiency and the speed ratio of the torque converter similar to FIG. 9 and is a diagram for explaining that the combined transmission efficiency is changed depending on a gear stage of the automatic transmission even when the operating point of the engine is not changed.

FIG. 14 is a diagram of relationship between the combined transmission efficiency $\eta_{CVT}$ and the speed ratio e of the torque converter 16 similar to FIG. 9 and is a diagram for explaining that the combined transmission efficiency $\eta_{CVT}$ is changed depending on a gear stage of the automatic transmission 18 even when the operating point of the engine 12 is not changed. Since the speed ratio e and the transmission rates $RTO_{PEL}$ and $RTO_{PMC}$ are changed depending on a gear stage of the automatic transmission 18 as described with reference to FIGS. 12 and 13, the combined transmission efficiency $\eta_{CVT}$ is changed depending on a gear stage of the automatic transmission 18 even if the operating point of the engine 12 is not changed, as depicted in FIG. 14. For example, in an example of FIG. 14, the combined transmission efficiency $\eta_{CVT}$ at the speed ratio e1 corresponding to the broken line L04 of FIG. 12 is smaller than the combined transmission efficiency $\eta_{CVT}$ at the speed ratio e2 corresponding to the dashed-dotted line L05 of FIG. 12. Therefore, in the example of FIG. 14, the combined transmission efficiency $\eta_{CVT}$ can be made higher when the gear stage of the automatic transmission 18 is shifted to the gear stage of the automatic transmission 18 corresponding to the dashed-dotted line L05 (the gear stage on the lower vehicle speed side), rather than being shifted to the gear stage of the automatic transmission 18 corresponding to the broken line L04 (the gear stage on the higher vehicle speed side). Therefore, while the engine 12 can be operated at higher efficiency by setting the target engine operating point on the engine minimum fuel consumption rate line $L_{FL}$ as depicted in FIG. 12, the combined transmission efficiency $\eta_{CVT}$ can be increased through selection of the gear stage of the automatic transmission 18 as depicted in FIG. 14. In short, the higher efficiency of the engine 12 and the higher efficiency of the continuously variable transmission 60 acting as a portion of the power transmission device can be satisfied at the same time through selection of the gear stage of the automatic transmission 18.

Figure 15:
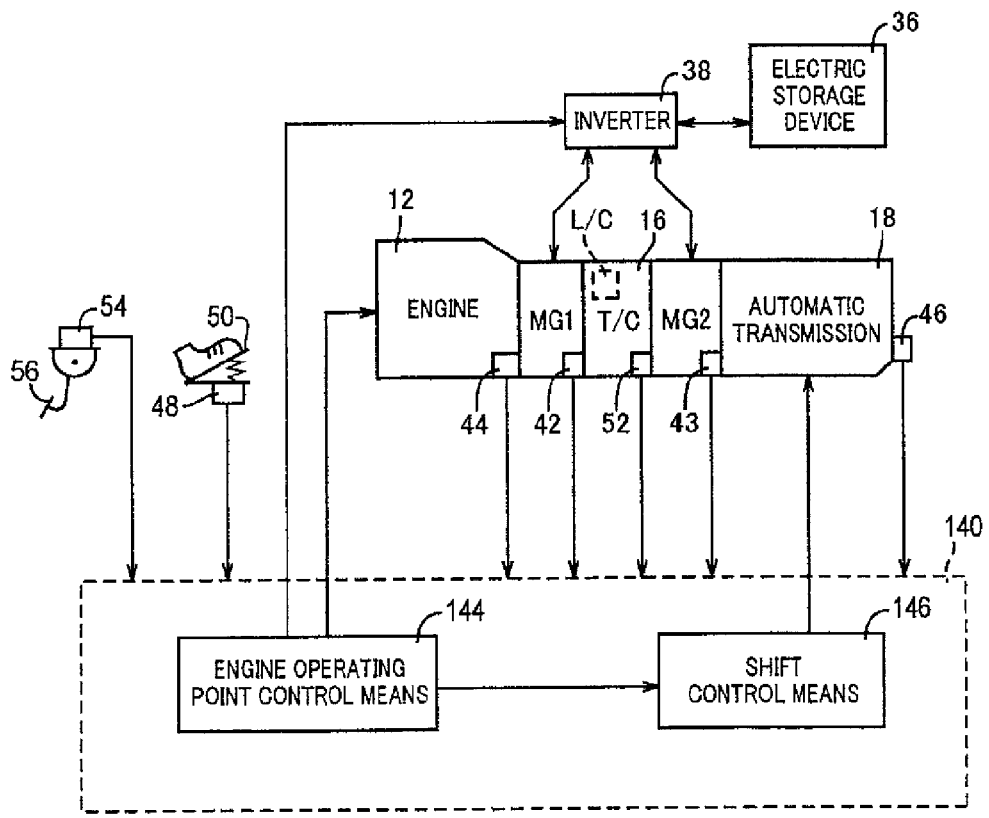
FIG. 15 is a functional block diagram for explaining a main portion of the control function included in an electronic control device of a second embodiment to control the vehicle drive device of FIG. 1.

A main portion of the control function of this embodiment will be described with reference to FIG. 15. FIG. 15 is a functional block diagram for explaining a main portion of the control function included in an electronic control device 140 of this embodiment. As depicted in FIG. 15, the electronic control device 140 includes an engine operating point control means 144 as an engine operating point control portion and a shift control means 146 as a shift control portion.

In the engine operating point control of this embodiment, selection of a shift stage (gear stage) of the automatic transmission 18 is taken into consideration unlike the first embodiment. Therefore, during the engine running, the engine operating point control means 144 determines the gear ratio $\gamma_{AT}$ of the automatic transmission 18, i.e., selects the shift stage (gear stage) of the automatic transmission 18 while adjusting the first electric motor torque $T_{MG1}$ to control the operating point of the engine 12. Therefore, as is the case with the engine operating point control means 70 of the first embodiment, the engine operating point control means 144 sequentially determines the target engine output (necessary engine power) Pe* based on the accelerator opening degree Acc and the vehicle speed V from a predetermined relationship and sequentially determines the target engine operating point as the operating point P05 (see FIG. 12) of the engine 12 at which the target engine output Pe* is achieved on the engine minimum fuel consumption rate line $L_{FL}$. Although the engine operating point control means 70 of the first embodiment determines the target engine operating point out of the engine minimum fuel consumption rate line $L_{FL}$ in some cases, this is not applied to the engine operating point control means 144 of this embodiment.

Along with the determination of the target engine operating point, the engine operating point control means 144 sequentially determines a shift stage of the automatic transmission 18 to be selected, based on the vehicle speed V and the required output torque $T_{OUT}$ (accelerator opening degree Acc) from the shift diagram depicted in FIG. 3. The shift stage of the automatic transmission 18 to be selected is referred to as a shift stage i. The shift stage i may be changed as described later before a shift of the automatic transmission 18 is started.

When the shift stage i is determined from the shift diagram, the engine operating point control means 144 calculates the combined transmission efficiency $\eta_{CVT}$ when the shift stage of the automatic transmission 18 is the shift stage i, i.e., the combined transmission efficiency $\eta_{CVT}$ corresponding to the shift stage i. Specifically, the engine operating point control means 144 calculates the turbine rotation speed Nt corresponding to the shift stage i based on the vehicle speed V and the gear ratio $\gamma_{AT}$ corresponding to the shift stage i. Since the determination of the turbine rotation speed Nt leads to determination of relationship between the pump torque Tp and the engine rotation speed Ne as represented by the broken line L04 or the dashed-dotted line L05 of FIG. 12, the engine operating point control means 144 calculates the speed ratio e, the pump torque Tp, and the first electric motor torque $T_{MG1}$ based on the calculated turbine rotation speed Nt and the engine rotation speed Ne indicated by the target engine operating point (e.g., the point P05 of FIG. 12) determined on the engine minimum fuel consumption rate line $L_{FL}$ as is the case with the engine operating point control means 70 of the first embodiment and calculates the combined transmission efficiency $\eta_{CVT}$ corresponding to the shift stage i with consideration given to the transmission rates $RTO_{PEL}$ and $RTO_{PMC}$ of the electric path and the mechanical path determined from the pump torque Tp and the first electric motor torque $T_{MG1}$.

Along with the calculation of the combined transmission efficiency $\eta_{CVT}$ corresponding to the shift stage i, the engine operating point control means 144 sequentially calculates the combined transmission efficiency $\eta_{CVT}$ corresponding to a shift stage i−1 that is a shift stage shifted by one stage toward the lower vehicle speed side as compared to the shift stage i and a shift stage i+1 that is a shift stage shifted by one stage toward the higher vehicle speed side as compared to the shift stage i in the same way.

After calculating the combined transmission efficiency $\eta_{CVT}$ corresponding to the shift stage i, the combined transmission efficiency $\eta_{CVT}$ corresponding to the shift stage i−1, and the combined transmission efficiency $\eta_{CVT}$ corresponding to the shift stage i+1, the engine operating point control means 144 compares the combined transmission efficiencies $\eta_{CVT}$ with each other and sequentially determines the shift stage corresponding to the highest combined transmission efficiency $\eta_{CVT}$ thereamong as the final shift stage of the automatic transmission 18 to be selected. Therefore, if the combined transmission efficiency $\eta_{CVT}$ corresponding to the shift stage i−1 is the highest, the shift stage i is updated to i−1 and if the combined transmission efficiency $\eta_{CVT}$ corresponding to the shift stage i+1 is the highest, the shift stage i is updated to i+1.

If the final shift stage of the automatic transmission 18 to be selected, i.e., the shift stage i is determined as a result of the mutual comparison of the combined transmission efficiencies $\eta_{CVT}$, the engine operating point control means 144 instructs the shift control means 146 to set the shift stage of the automatic transmission 18 to the shift stage i. Additionally, on the assumption that the shift stage of the automatic transmission 18 is the shift stage i, the engine operating point control means 144 provides the output control of the engine 12 and the first electric motor MG1 such that the actual operating point of the engine 12 indicated by the actual engine rotation speed Ne and engine torque Te matches the target engine operating point (e.g., P05 of FIG. 12) determined to achieve the target engine output Pe* on the engine minimum fuel consumption rate line $L_{FL}$ as is the case with the engine operating point control means 70 of the first embodiment. In this case, the second electric motor MG2 is driven in the same way as the first embodiment.

When instructed by the engine operating point control means 144 to set the shift stage of the automatic transmission 18 to the shift stage i, the shift control means 146 makes the shift to switch the shift stage of the automatic transmission 18 to the shift stage i if the current shift stage of the automatic transmission 18 is not the shift stage i. In other words, the shift control means 146 engages or releases each of the hydraulic friction engagement devices (the clutches C1 to C4, the brakes B1 and B2) in accordance with the operation table of FIG. 2 so as to achieve the shift stage i. As described above, since the combined transmission efficiencies $\eta_{CVT}$ corresponding to a plurality of shift stages are compared with each other to select the shift stage corresponding to the highest combined transmission efficiency $\eta_{CVT}$ thereamong and the automatic transmission 18 is shifted to the selected shift stage, it can be said that the engine operating point control means 144 changes the shift stage of the automatic transmission 18, i.e., the gear ratio $\gamma_{AT}$ of the automatic transmission 18 to the side of higher combined transmission efficiency $\eta_{CVT}$. Since the combined transmission efficiency $\eta_{CVT}$ is determined depending on the speed ratio e changed by a shift of the automatic transmission 18 as depicted in FIG. 14, it can be said that the engine operating point control means 144 selects the shift stage of the automatic transmission 18, i.e., determines the gear ratio $\gamma_{AT}$ of the automatic transmission 18, based on the speed ratio e of the torque converter 16.

As described above in the first embodiment with reference to FIG. 9, in the case of the occurrence of power circulation in which the first electric motor MG1 consumes electric power while the second electric motor MG2 generates electricity, i.e., in the case of the power circulation state, the combined transmission efficiency $\eta_{CVT}$ is significantly reduced. As described above, the engine operating point control means 144 compares the combined transmission efficiencies $\eta_{CVT}$ corresponding to a plurality of shift stages of the automatic transmission 18 with each other and selects the shift stage corresponding to the highest combined transmission efficiency $\eta_{CVT}$ thereamong. As a result, the engine operating point control means 144 does not select a shift stage causing the power circulation significantly reducing the combined transmission efficiency $\eta_{CVT}$ and, therefore, it can be said that the engine operating point control means 144 inhibits the selection of the shift stage of the automatic transmission 18 causing the power circulation, i.e., inhibits a change to the gear ratio $\gamma_{AT}$ of the automatic transmission 18 causing the power circulation.

Figure 16:
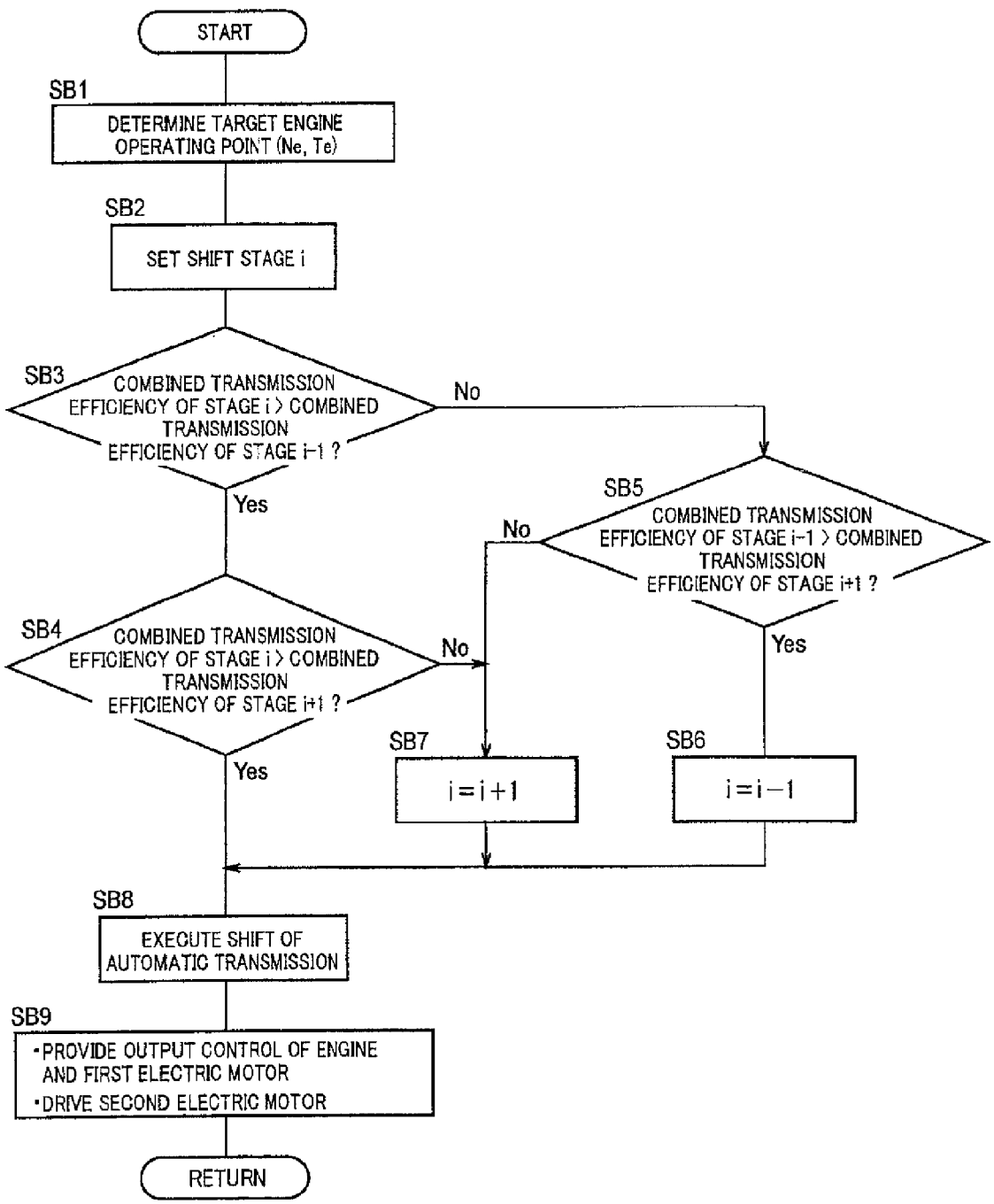
FIG. 16 is a flowchart in the second embodiment for explaining a main portion of the control operation of the electronic control device of FIG. 15, i.e., the control operation of selecting a shift stage of the automatic transmission so as to increase the combined transmission efficiency.

FIG. 16 is a flowchart for explaining a main portion of the control operation of the electronic control device 140, i.e., the control operation of selecting a shift stage of the automatic transmission 18 so as to increase the combined transmission efficiency $\eta_{CVT}$ and is repeatedly executed with an extremely short cycle time, for example, on the order of few msec to a few tens of msec. The control operation depicted in FIG. 16 is performed solely or concurrently with another control operation. SB1 to SB7 and SB9 correspond to the engine operating point control means 144 and SB8 corresponds to the shift control means 146.

First, at SB1, as is the case with SA1 of FIG. 11 of the first embodiment, the target engine output (necessary engine power) Pe* is calculated and the target engine operating point is determined as an operating point (e.g., the point P05 of FIG.

12) of the engine 12 at which the target engine output Pe* is achieved on the engine minimum fuel consumption rate line $L_{FL}$. SB1 is followed by SB2.

At SB2, the shift stage i is determined based on the vehicle speed V and the required output torque $T_{OUT}$ (accelerator opening degree Acc) from the shift diagram depicted in FIG. 3. SB2 is followed by SB3.

At SB3, based on the engine rotation speed Ne and the engine torque Te indicated by the target engine operating point determined at SB1, the combined transmission efficiency $\eta_{CVT}$ corresponding to the shift stage i and the combined transmission efficiency $\eta_{CVT}$ corresponding to the shift stage i−1 are calculated. It is determined whether the combined transmission efficiency $\eta_{CVT}$ corresponding to the shift stage i is higher than the combined transmission efficiency $\eta_{CVT}$ corresponding to the shift stage i−1. If the determination at SB3 is affirmative, i.e., if the combined transmission efficiency $\eta_{CVT}$ corresponding to the shift stage i is higher than the combined transmission efficiency $\eta_{CVT}$ corresponding to the shift stage i−1, the operation goes to SB4. On the other hand, if the determination at SB3 is negative, the operation goes to SB5.

At SB4, based on the engine rotation speed Ne and the engine torque Te indicated by the target engine operating point determined at SB1, the combined transmission efficiency $\eta_{CVT}$ corresponding to the shift stage i+1 is calculated. It is determined whether the combined transmission efficiency $\eta_{CVT}$ corresponding to the shift stage i calculated at SB3 is higher than the combined transmission efficiency $\eta_{CVT}$ corresponding to the shift stage i+1. If the determination at SB4 is affirmative, i.e., if the combined transmission efficiency $\eta_{CVT}$ corresponding to the shift stage i is higher than the combined transmission efficiency $\eta_{CVT}$ corresponding to the shift stage i+1, the operation goes to SB8. On the other hand, if the determination at SB4 is negative, the operation goes to SB7.

At SB5, based on the engine rotation speed Ne and the engine torque Te indicated by the target engine operating point determined at SB1, the combined transmission efficiency $\eta_{CVT}$ corresponding to the shift stage i+1 is calculated. It is determined whether the combined transmission efficiency $\eta_{CVT}$ corresponding to the shift stage i−1 calculated at SB3 is higher than the combined transmission efficiency $\eta_{CVT}$ corresponding to the shift stage i+1. If the determination at SB5 is affirmative, i.e., if the combined transmission efficiency $\eta_{CVT}$ corresponding to the shift stage i−1 is higher than the combined transmission efficiency $\eta_{CVT}$ corresponding to the shift stage i+1, the operation goes to SB6. On the other hand, if the determination at SB5 is negative, the operation goes to SB7.

At SB6, the shift stage i is updated to i−1. SB6 is followed by SB8.

At SB7, the shift stage i is updated to i+1. SB7 is followed by SB8.

At SB8, if the current shift stage of the automatic transmission 18 is not the shift stage i, a shift is made to switch the shift stage of the automatic transmission 18 to the shift stage i.

At SB9, as is the case with SA11 of FIG. 11, the output control of the engine 12 and the first electric motor MG1 is provided such that an actual operating point of the engine 12 indicated by the actual engine rotation speed Ne and engine torque Te matches, for example, follows, the target engine operating point determined at SB1. The second electric motor MG2 is driven at the same time.

This embodiment has the following effects (B1) to (B4) in addition to the effects (A1) and (A2) of the first embodiment.

(B1) According to this embodiment, during the engine running, the engine operating point control means 144 determines the gear ratio $\gamma_{AT}$ of the automatic transmission 18 while adjusting the first electric motor torque $T_{MG1}$ to control the operating point of the engine 12. Therefore, since the pump torque Tp can be increased and decreased without changing the operating point of engine 12 by shifting the automatic transmission 18 to change the gear ratio $\gamma_{AT}$ thereof, the engine 12 itself can be driven at higher efficiency and, as compared to the case that the automatic transmission 18 is not shifted, power can be transmitted from the engine 12 to the drive wheels 58 at higher efficiency.

(B2) According to this embodiment, the engine operating point control means 144 changes the gear ratio $\gamma_{AT}$ of the automatic transmission 18 to the side of higher combined transmission efficiency $\eta_{CVT}$. Therefore, since the combined transmission efficiency $\eta_{CVT}$ is increased as compared to the case that the automatic transmission 18 is not shifted in association with the combined transmission efficiency $\eta_{CVT}$, the loss in power transmission of the continuously variable transmission 60 is reduced and the vehicle fuel efficiency can be improved.

(B3) According to this embodiment, the engine operating point control means 144 regulates, or specifically, inhibits, a change to the gear ratio $\gamma_{AT}$ of the automatic transmission 18 causing the power circulation. Therefore, although the occurrence of the power circulation considerably reduces the combined transmission efficiency $\eta_{CVT}$, a loss in power transmission from the engine 12 to the drive wheels 58 is suppressed and the deterioration in vehicle fuel efficiency can be suppressed.

(B4) According to this embodiment, the engine operating point control means 144 controls the operating point of the engine 12 such that the operating point of the engine 12 is located along the engine minimum fuel consumption rate line $L_{FL}$ and that the target engine output Pe* is achieved. Therefore, a rise in the fuel consumption rate of the engine 12 can be suppressed by the continuously variable transmission operation of the continuously variable transmission 60, or in other words, the engine 12 can be driven at higher efficiency.

Third Embodiment

This embodiment is the same as the second embodiment in that the shift stage of the automatic transmission 18 is selected to increase the combined transmission efficiency $\eta_{CVT}$. However, a difference from the second embodiment is that if the torque of the first electric motor MG1 or the second electric motor MG2 runs short due to electric power limitation of the first electric motor MG1 or the second electric motor MG2, the selection of the shift stage, i.e., the determination of the gear ratio $\gamma_{AT}$ is limited so as to avoid the occurrence of the torque shortage. The following description is based on the details of the second embodiment and the points different from the second embodiment will mainly be described without describing the points of this embodiment common with the second embodiment.

Figure 17:
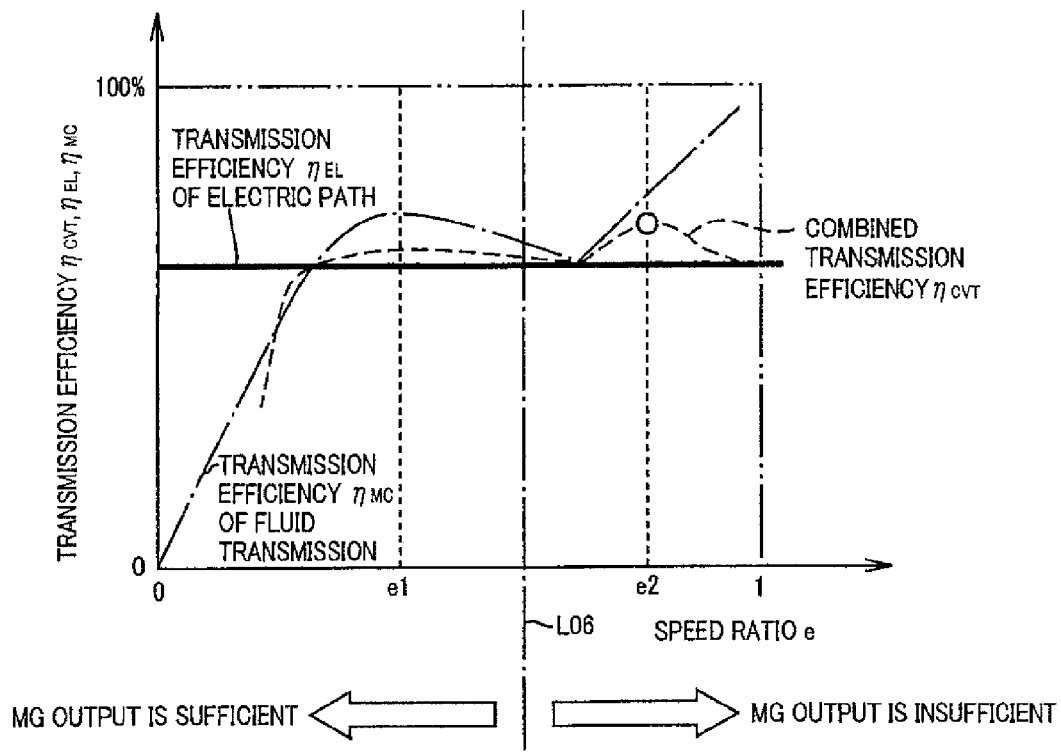
FIG. 17 is a diagram of relationship between the combined transmission efficiency and the speed ratio of the torque converter similar to FIG. 14 and is a diagram having a dashed-dotted line L06 indicative of a boundary of torque shortage of the first electric motor or the second electric motor added to FIG. 14.

FIG. 17 is a diagram of relationship between the combined transmission efficiency $\eta_{CVT}$ and the speed ratio e of the torque converter 16 similar to FIG. 14 and is a diagram having a dashed-dotted line L06 indicative of a boundary of torque shortage of the first electric motor MG1 or the second electric motor MG2 added to FIG. 14. In FIG. 17, e1 and e2 indicative of certain speed ratios e are the same as those of FIG. 14. FIG. 17 depicts that the torque shortage (output shortage) occurs in the first electric motor MG1 or the second electric motor MG2 in a speed ratio range equal to or greater than the speed ratio e indicated by the dashed-dotted line L06 while no torque shortage occurs in the first electric motor MG1 and the second electric motor MG2 in a speed ratio range less than the speed ratio e indicated by the dashed-dotted line L06. As can be seen from FIG. 13, in the engine operating point control, i.e., the continuously variable transmission operation of the continuously variable transmission 60, when the speed ratio e is larger, the transmission rate $RTO_{PEL}$ of the electric path is higher and, therefore, the torque shortage of the first electric motor MG1 or the second electric motor MG2 more easily occurs. The torque shortage of the first electric motor MG1 or the second electric motor MG2 occurs because the output of the first electric motor MG1 or the second electric motor MG2 is limited and, with regard to a cause of the limitation of the output, it is conceivable that, for example, the utilization of the electric power generated by the first electric motor MG1 for charging the electric storage device 36 puts limitations on the electric power usable for the continuously variable transmission operation of the continuously variable transmission 60, i.e., the electric power given and received through the electric path for the engine operating point control. The output of the first electric motor MG1 or the second electric motor MG2 may also be limited for the heating protection of the first electric motor MG1, the second electric motor MG2, and the inverter 38.

In FIG. 17, since the combined transmission efficiency $\eta_{CVT}$ is higher when the speed ratio e is e2 as compared to e1, a shift should be made to the shift stage of the automatic transmission 18 achieving the speed ratio e of e2 in terms of the combined transmission efficiency $\eta_{CVT}$. However, since the shift to the shift stage of the automatic transmission 18 achieving the speed ratio e of e2 causes the torque shortage of the first electric motor MG1 or the second electric motor MG2, the shift to the shift stage corresponding to the speed ratio e2 is inhibited and, in this case, the automatic transmission 18 is shifted to the shift stage corresponding to the speed ratio e1, which is shifted by one stage toward the higher vehicle speed side as compared to the shift stage corresponding to the speed ratio e2. As exemplarily illustrated in FIG. 17, in this embodiment, the shift stage on the lower vehicle speed side is limited in the range of selectable shift stages of the automatic transmission 18, or in other words, the gear ratio $\gamma_{AT}$ on the lower vehicle speed side is limited in the range of determinable (shiftable) gear ratios $\gamma_{AT}$ of the automatic transmission 18, so as to avoid the torque shortage of the first electric motor MG1 or the second electric motor MG2 in the engine operating point control. A main portion of the control function will hereinafter be described with reference to FIG. 18.

Figure 18:
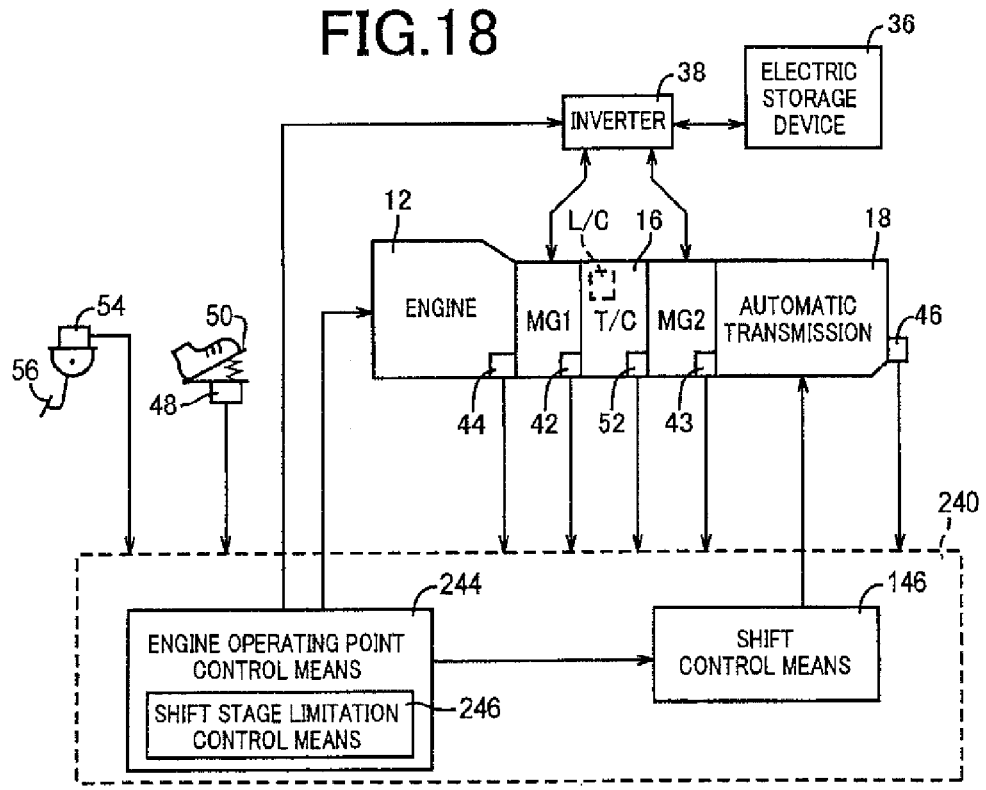
FIG. 18 is a function block diagram for explaining a main portion of the control function included in an electronic control device of a third embodiment to control the vehicle drive device of FIG. 1.

FIG. 18 is a function block diagram for explaining a main portion of the control function included in an electronic control device 240 of this embodiment. As depicted in FIG. 18, although the shift control means 146 is included as is the case with the electronic control device 140 of the second embodiment, the electronic control device 240 includes an engine operating point control means 244 instead of the engine operating point control means 144 unlike the electronic control device 140. The engine operating point control means 244 includes a shift stage limitation control means 246 as a shift stage limitation control portion. The engine operating point control means 244 is the same as the engine operating point control means 144 in the second embodiment except including the shift stage limitation control means 246.

The shift stage limitation control means 246 provides a shift stage limitation control for limiting the selectable shift stages of the automatic transmission 18 depending on an electric power upper limit value $LMT_{PMG}$ allowed for the first electric motor MG1 or the second electric motor MG2 in the engine operating point control, i.e., the continuously variable transmission operation of the continuously variable transmission 60. In the shift stage limitation control, limiting the selectable shift stages of the automatic transmission 18 is, in other words, to limit the determinable (shiftable) gear ratios $\gamma_{AT}$ of the automatic transmission 18 and, therefore, the shift stage limitation control may be referred to as gear ratio limitation control. The shift stage limitation control is provided with consideration given to the fuel efficiency and the durability of the electric motors MG1 and MG2. To provide the shift stage limitation control, the shift stage limitation control means 246 sequentially sets the electric power upper limit value $LMT_{PMG}$ as a threshold value. For example, assuming that the transmission efficiency $\eta_{EL}$ of the electric path is 100%, i.e., 1, in the continuously variable transmission operation of the continuously variable transmission 60, the same electric power as the electric power utilized for the continuously variable transmission operation is directly supplied to the second electric motor MG2 out of the electric power generated by the first electric motor MG1 in such a relationship that if the power consumption of the second electric motor MG2 is reduced, the generated electric power of the first electric motor MG1 is accordingly reduced and, therefore, the electric power upper limit value $LMT_{PMG}$ in the shift stage limitation control may be an upper limit value to the output of the first electric motor MG1 for performing the continuously variable transmission operation of the continuously variable transmission 60 or may be an upper limit value to the output of the second electric motor MG2. In the following description of this embodiment, to facilitate understanding, the electric power upper limit value $LMT_{PMG}$ is the upper limit value to the output of the second electric motor MG2. Since the outputs of the electric motors MG1 and MG2 are negative values when the electric motors MG1 and MG2 perform the regenerative operation, the electric power upper limit value $LMT_{PMG}$ is compared with the outputs of the electric motors MG1 and MG2 in terms of the absolute value.

The shift stage limitation control means 246 sets the electric power upper limit value $LMT_{PMG}$ as described above and, specifically, the electric power upper limit value $LMT_{PMG}$ is set based on the target value of the charging power to be stored in the electric storage device 36, i.e., the required charging power. For example, the relationship between the required charging power and the electric power upper limit value $LMT_{PMG}$ is empirically set in advance so as to prevent insufficient charging of the electric storage device 36 while increasing the outputs of the electric motors MG1 and MG2 utilized for the continuously variable transmission operation of the continuously variable transmission 60, and the shift stage limitation control means 246 sets the electric power upper limit value $LMT_{PMG}$ lower when the required charging power is larger in accordance with the relationship empirically set in advance. This is because when the required charging power is larger, the electric power utilized for the continuously variable transmission operation of the continuously variable transmission 60 is reduced out of the electric power generated by the first electric motor MG1. The electric power upper limit value $LMT_{PMG}$ may be set as a constant value when the electric storage device 36 should be charged, instead of being changed depending on the required charging power.

Alternatively, the shift stage limitation control means 246 may set the electric power upper limit value $LMT_{PMG}$ so as to prevent a rise in temperature, and ensure durability, of the first electric motor MG1, the second electric motor MG2, or the inverter 38. In such a case, for example, the relationship between the temperature of each of the first electric motor MG1, the second electric motor MG2, and the inverter 38 and the electric power upper limit value $LMT_{PMG}$ is empirically set in advance so as to prevent a rise in temperature of the first electric motor MG1, the second electric motor MG2, and the inverter 38 while increasing the outputs of the electric motors MG1 and MG2 utilized for the continuously variable transmission operation of the continuously variable transmission 60. The shift stage limitation control means 246 sets the electric power upper limit value $LMT_{PMG}$ based on the temperature of the first electric motor MG1, the second electric motor MG2, or the inverter 38 in accordance with the relationship empirically set in advance. If the electric power upper limit value $LMT_{PMG}$ is set as described above based on the temperature of the first electric motor MG1, the second electric motor MG2, or the inverter 38, the electric power upper limit value $LMT_{PMG}$ may be set lower when the temperature of the first electric motor MG1, the second electric motor MG2, or the inverter 38 is higher, or the electric power upper limit value $LMT_{PMG}$ may be set to a constant value.

As is the case with the engine operating point control means 144 of the second embodiment, the engine operating point control means 244 compares the respective combined transmission efficiencies $\eta_{CVT}$ corresponding to the shift stages i, i+1, and i−1 with each other and determines the final shift stage of the automatic transmission 18 to be selected, i.e., the shift stage i and, subsequently, on the assumption that the shift stage of the automatic transmission 18 is the shift stage i, the shift stage limitation control means 246 calculates the output (e.g., in kW) of the second electric motor MG2 in the engine operating point control, i.e., in the continuously variable transmission operation of the continuously variable transmission 60. For example, the shift stage limitation control means 246 can calculate the first electric motor torque $T_{MG1}$ based on the target engine operating point (point P05) as depicted in FIG. 12, calculate the generated electric power of the first electric motor MG1 based on the first electric motor torque $T_{MG1}$ and the first electric motor rotation speed $N_{MG1}$ (=Ne), and calculate the output of the second electric motor MG2 based on a value acquired by subtracting the required charging power from the generated electric power of the first electric motor MG1.

If the electric power upper limit value $LMT_{PMG}$ is set and the output of the second electric motor MG2 in the continuously variable transmission operation is calculated, the shift stage limitation control means 246 determines whether the output of the second electric motor MG2 is less than the electric power upper limit value $LMT_{PMG}$, and if the output of the second electric motor MG2 is not less than the electric power upper limit value $LMT_{PMG}$, i.e., if the output of the second electric motor MG2 is equal to or greater than the electric power upper limit value $LMT_{PMG}$, the shift stage limitation control means 246 updates the shift stage i to i+1. For example, if 3rd is the shift stage i before the determination that the output of the output of the second electric motor MG2 is equal to or greater than the electric power upper limit value $LMT_{PMG}$, the shift stage i is shifted by one stage toward the higher vehicle speed side and changed to 4th. After the update of the shift stage i, the shift stage limitation control means 246 calculates the output of the second electric motor MG2 in the continuously variable transmission operation again on the premise of the updated shift stage i. As described above, the shift stage limitation control means 246 repeatedly updates the shift stage i to i+1 and calculates the output of the second electric motor MG2 until the output of the second electric motor MG2 becomes less than the electric power upper limit value $LMT_{PMG}$. If the calculated output of the second electric motor MG2 becomes less than the electric power upper limit value $LMT_{PMG}$, the shift stage limitation control means 246 maintains the shift stage i at this point without updating the shift stage i and permits the engine operating point control means 244 to give an instruction to the shift control means 146 to indicate that the shift stage of the automatic transmission 18 should be set to the shift stage i. As described above, the shift stage limitation control means 246 provides the shift stage limitation control in the continuously variable transmission operation of the continuously variable transmission 60.

If permitted by the shift stage limitation control means 246 to give an instruction indicating that the shift stage of the automatic transmission 18 should be set to the shift stage i, the engine operating point control means 244 gives an instruction to the shift control means 146 to indicate that the shift stage should be set to the shift stage i as is the case with the engine operating point control means 144 of the first embodiment while providing the output control of the engine 12 and the first electric motor MG1. In this case, the second electric motor MG2 is driven in the same way as the second embodiment.

Figure 19:
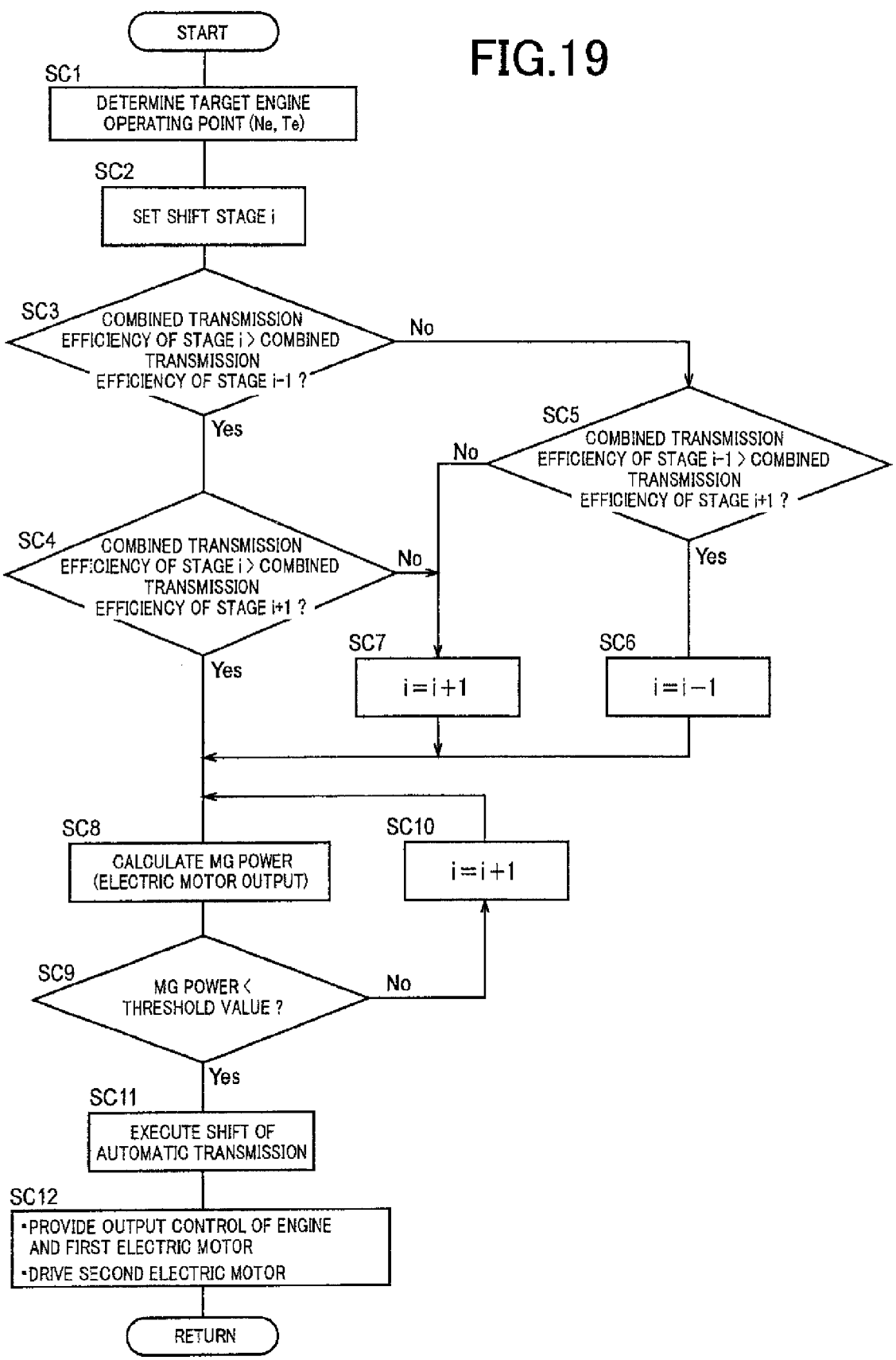
FIG. 19 is a flowchart for explaining a main portion of the control operation of the electronic control device of FIG. 18, i.e., the control operation of selecting a shift stage of the automatic transmission so as to increase the combined transmission efficiency while a shift stage limitation control is provided.

FIG. 19 is a flowchart for explaining a main portion of the control operation of the electronic control device 240, i.e., the control operation of selecting a shift stage of the automatic transmission 18 so as to increase the combined transmission efficiency $\eta_{CVT}$ while the shift stage limitation control is provided, and is repeatedly executed with an extremely short cycle time, for example, on the order of few msec to a few tens of msec. The control operation depicted in FIG. 19 is performed solely or concurrently with another control operation. SC1 to SC7 and SC12 correspond to the engine operating point control means 244; SC8 to SC10 correspond to the shift stage limitation control means 246; and SC11 corresponds to the shift control means 146. The details of SC1 to SC7, SC11, and SC12 of FIG. 19 are the same as SB1 to SB7, SB8, and SB9, respectively, of FIG. 16, i.e., the flowchart of the second embodiment. Therefore, FIG. 19 will be described in terms of SC8 to SC10.

In FIG. 19, if the determination at SC4 is affirmative or after SC6 or SC7, the operation goes to SC8. At SC8, the output of the second electric motor MG2 (electric motor power) in the continuously variable transmission operation of the continuously variable transmission 60 is calculated on the assumption that the shift stage of the automatic transmission 18 is the shift stage i. SC8 is followed by SC9. In FIG. 19, MG denotes an electric motor.

At SC9, it is determined whether the output of the second electric motor MG2 calculated at SC8 is less than the electric power upper limit value $LMT_{PMG}$. For example, the electric power upper limit value $LMT_{PMG}$ is a threshold value and may be set based on the temperature of the first electric motor MG1, the second electric motor MG2, or the inverter 38 or may be set based on the required charging power. If the determination at SC9 is affirmative, i.e., if the output of the second electric motor MG2 is less than the electric power upper limit value $LMT_{PMG}$, the operation goes to SC11. On the other hand, if the determination at SC9 is negative, the operation goes to SC10.

At SC10, the shift stage i is updated to i+1. The reason of changing the setting of the shift stage i to the shift stage on the higher vehicle speed side in this way is that when the shift stage of the automatic transmission 18 is on the higher vehicle speed side, the speed ratio e becomes smaller, resulting in a lower transmission rate $RTO_{PEL}$ of the electric path in the continuously variable transmission operation of the continuously variable transmission 60 (see FIG. 13). SC10 is followed by SC8.

This embodiment produces the following effects in addition to the effects of the second embodiment. According to the this embodiment, the shift stage limitation control means 246 provides the shift stage limitation control (gear ratio limitation control) for limiting the determinable gear ratios $\gamma_{AT}$ of the automatic transmission 18 depending on the electric power upper limit value $LMT_{PMG}$ allowed for the first electric motor MG1 or the second electric motor MG2 in the continuously variable transmission operation of the continuously variable transmission 60. Therefore, if the output of the first electric motor MG1 or the second electric motor MG2 is limited depending on the electric power upper limit value $LMT_{PMG}$, the torque shortage of the first electric motor MG1 or the second electric motor MG2 due to the output limitation can be avoided. If the electric power upper limit value $LMT_{PMG}$ is set for the purpose of the heating protection etc., of the first electric motor MG1 or the second electric motor MG2, deterioration in durability of the first electric motor MG1 or the second electric motor MG2 can be suppressed. If the electric power upper limit value $LMT_{PMG}$ is set based on the required charging power, the electric power stored in the electric storage device 36 is consumed by hybrid running and, as a result, the fuel efficiency can be improved.

Although the exemplary embodiments of the present invention have been described in detail with reference to the drawings, the present invention is not limited to the embodiments and can be implemented in other forms.

For example, although the engine 12 is a gasoline engine in the first to third embodiments, the engine 12 may be a diesel engine using light oil etc., as fuel.

Although the automatic transmission 18 is a stepped transmission in the first to third embodiments, the automatic transmission 18 may be a continuously variable transmission (CVT) capable of continuously varying the gear ratio $\gamma_{AT}$.

Figure 20:
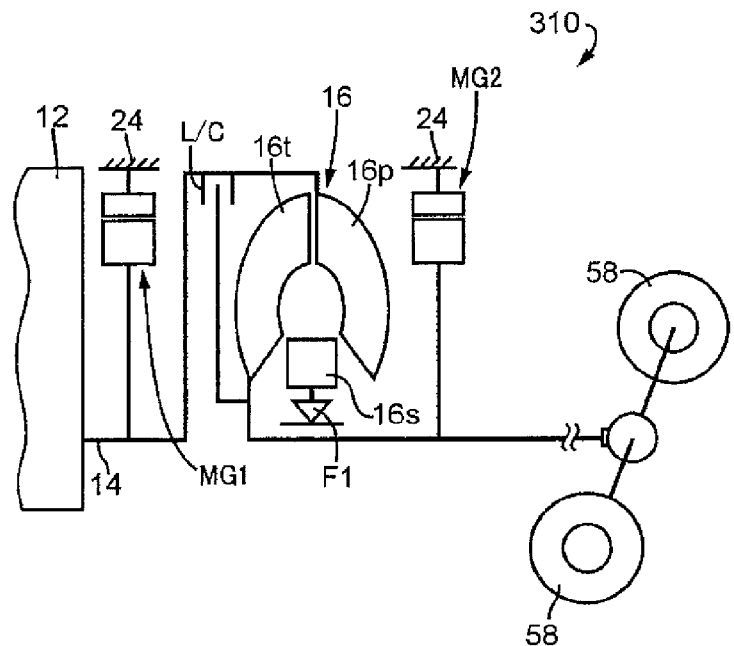
FIG. 20 is a schematic for explaining a configuration of a vehicle drive device different from that of FIG. 1 and is a schematic for explaining a configuration of a vehicle drive device without an automatic transmission.

Although the vehicle drive device 10 includes the automatic transmission 18 subjected to the automatic shift control in the first embodiment, a configuration without the automatic transmission 18 may be conceivable as in the case of a vehicle drive device 310 depicted in FIG. 20, for example.

Although the first electric motor MG1 is driven to perform regenerative operation and the first electric motor torque $T_{MG1}$ is generated in the negative rotation direction in the engine operating point control in the first embodiment, the power circulation may be permitted such that the first electric motor MG1 consumes electric power while the second electric motor MG2 generates electricity, i.e., the first electric motor torque $T_{MG1}$ may be generated in the positive rotation direction in some cases.

In the first to third embodiments, the second electric motor MG2 is coupled to the input shaft 20 of the automatic transmission 18 as depicted in FIG. 1 and, therefore, the second electric motor MG2 is indirectly coupled via the automatic transmission 18 to the drive wheels 58; however, the second electric motor MG2 may be coupled to the output shaft 22 instead of the input shaft 20. If the second electric motor MG2 is coupled to the output shaft 22 in this way, the second electric motor MG2 and the drive wheels 58 rotate in one-to-one relationship without interruption of power transmission and, therefore, it can be said that the second electric motor MG2 is directly coupled to the drive wheels 58. The second electric motor MG2 may be a wheel-in motor built into the drive wheels 58. In this case, a total of the two second electric motors MG2 is disposed in the left and right drive wheels 58.

In the first to third embodiments, the second electric motor MG2 is coupled to the drive wheels 58 that are rear wheels indirectly coupled to the engine 12 as depicted in FIG. 1; however, the engine 12 and the first electric motor MG1 may be coupled to the rear wheels as depicted in FIG. 1 while the second electric motor MG2 may directly or indirectly be coupled to front wheels instead of the rear wheels. If the second electric motor MG2 is coupled to the front wheels in this way, the front wheels are included in drive wheels. In short, the drive wheels driven by the power from the engine 12 may be wheels different from the drive wheels driven by the power from the second electric motor MG2.

Although the first electric motor torque $T_{MG1}$ is adjusted in the engine operating point control, i.e., the continuously variable transmission operation of the continuously variable transmission 60 described in the first to third embodiments, the first electric motor torque $T_{MG1}$ may directly be adjusted or may be adjusted as a result of adjustment of the second electric motor torque $T_{MG2}$, i.e., adjustment of the output of the second electric motor MG2, or in other words, in an indirect manner.

In the first to third embodiments, the power transmission is electrically performed through the electric path by giving and receiving electric power between the first electric motor MG1 and the second electric motor MG2; however, for example, the electric power generated by the first electric motor MG1 may directly be supplied to the second electric motor MG2 without passing through the electric storage device 36 or the electric power generated by the first electric motor MG1 may indirectly be supplied to the second electric motor MG2 in such a manner that the electric power generated by the first electric motor MG1 is once stored in the electric storage device 36 and then supplied from the electric storage device 36 to the second electric motor MG2. The same applies to the time of the power circulation.

In the first to third embodiments, the power transmission is electrically performed through the electric path in the engine operating point control by giving and receiving electric power between the first electric motor MG1 and the second electric motor MG2; however, for example, the second electric motor MG2 may be driven by the supply of electric power from the electric storage device 36 or the supply of electric power from the electric storage device 36 along with electric power generated by the first electric motor MG1. The same applies to the electric power supply to the first electric motor MG1 in the case of power running of the first electric motor MG1 at the time of the power circulation.

Although the first electric motor MG1 is directly coupled to the pump impeller 16p of the torque converter 16 as depicted in FIG. 1 in the first to third embodiments, the first electric motor MG1 may indirectly be coupled to the pump impeller 16p via a transmission, a clutch, an electric belt, or the like.

Although the vehicle drive device 10 includes the electric storage device 36 in the first and second embodiments, the electric storage device 36 may not be included.

Although SA3 is followed by SA4 in the flowchart of FIG. 11 in the first embodiment, either of these steps may come first and, for example, in the flowchart, after SA2 is followed by SA4, if the determination at SA4 is affirmative, the operation may go to SA3, and SA3 may be followed by SA5.

Although the engine rotation speed Ne indicated by the target engine operating point is increased by the predetermined change amount ΔNe to determine a new target engine operating point at SA5 of the flowchart of FIG. 11 in the first embodiment, the engine rotation speed Ne may be decreased by the predetermined change amount ΔNe to determine a new target engine operating point. In such a case, at SA9 of FIG. 11, the engine rotation speed Ne indicated by the current target engine operating point determined at SA5 is increased by the predetermined change amount ΔNe to determine a new target engine operating point.

With regard to the flowchart depicted in FIG. 11 of the first embodiment, it is conceivable that the flowchart may not include steps SA3 to SA10 so that SA11 is executed after SA2.

In the flowchart depicted in FIG. 16 of the second embodiment, the combined transmission efficiencies $\eta_{CVT}$ are compared with each other among three shift stages, i.e., the shift stages i, i+1, and i−1 of the automatic transmission 18; however, the combined transmission efficiencies $\eta_{CVT}$ may respectively be calculated for all the selectable shift stages of the automatic transmission 18 and these combined transmission efficiencies $\eta_{CVT}$ may be compared with each other.

Although the target engine operating point is set on the engine minimum fuel consumption rate line $L_{FL}$ as indicated by, for example, the point P05 in FIG. 12 in the second and third embodiments, it is conceivable that the target engine operating point is set out of the engine minimum fuel consumption rate line $L_{FL}$.

Although it is described that the electric power upper limit value $LMT_{PMG}$ used at SC9 of FIG. 19 may be set based on the required charging power in the third embodiment, the required charging power may be reduced based on the output of the first electric motor MG1 or the second electric motor MG2 required for the continuously variable transmission operation of the continuously variable transmission 60 during a predetermined electric motor drive priority time. In such a case, when the required output of the first electric motor MG1 or the second electric motor MG2 is larger, the required charging power is more reduced. The predetermined electric motor drive priority time represents the case that the continuously variable transmission operation of the continuously variable transmission 60 is prioritized over the charging of the electric storage device 36, and is empirically determined in advance. For example, if the charge remaining amount SOC of the electric storage device 36 is slightly lower than the target value thereof and if a change in a brake pedal depressing force or a change in the accelerator opening degree Acc satisfies a condition in which regeneration is expected, the priority of the charging of the electric storage device 36 is lower and it is better to prioritize the continuously variable transmission operation of the continuously variable transmission 60 for improving the instantaneous fuel efficiency and, therefore, each of these cases corresponds to the predetermined electric motor drive priority time.

Although the vehicle can perform the motor running in the first to third embodiments, the vehicle may always run by performing the engine running.

Although the torque converter 16 includes the lockup clutch L/C in the first to third embodiments, since the lockup clutch L/C is released in the continuously variable transmission operation of the continuously variable transmission 60, the lockup clutch L/C may not be included.

Although the automatic transmission 18 is shifted to Rev1 or Rev2 depicted in FIG. 2 and the input shaft 20 of the automatic transmission 18 is rotated in the positive rotation direction when the vehicle is caused to run backward in the first to third embodiments, the vehicle may be caused to run backward by shifting the automatic transmission 18 to any one of 1st to 8th depicted in FIG. 2 and driving the second electric motor MG2 in the negative rotation direction.

Although the vehicle drive device 10 includes the torque converter 16 as a hydraulic power transmission device in the first to third embodiments, a fluid coupling may be disposed instead of the torque converter 16.

In the first to third embodiments, the vehicle drive devices 10 and 310 are not limited to those used in FR (front-engine rear-drive) type vehicles and may be those used in vehicles of other drive types.

Although the transmission rates $RTO_{PEL}$ and $RTO_{PMC}$ of the electric path and the mechanical path are not changed stepwise as depicted in FIG. 7 in the continuously variable transmission operation of the continuously variable transmission 60 in the first to third embodiments, since the transmission efficiency $\eta_{EL}$ of the electric path is higher than the transmission efficiency $\eta_{MC}$ of the mechanical path in the lower speed ratio range relative to the speed ratio indicated by the intersection point between the dashed-dotted line and the solid line as depicted in FIG. 9 while the transmission efficiency $\eta_{MC}$ of the mechanical path is higher than the transmission efficiency $\eta_{EL}$ of the electric path in the higher speed ratio range, for example, the power transmission may be performed through only the electric path in the lower speed ratio range and the power transmission may be performed through only the mechanical path in the higher speed ratio range.

Although the engine operating point control means 144 inhibits the change to the gear ratios $\gamma_{AT}$ of the automatic transmission 18 causing the power circulation in the second embodiment and this is preferable, if a vehicle running state etc., satisfy, for example, a shift priority condition empirically determined in advance in which a shift of the automatic transmission 18 should be prioritized over the fuel efficiency improvement, the inhibition may be cancelled. In short, it is only necessary to regulate the change to the gear ratios $\gamma_{AT}$ of the automatic transmission 18 causing the power circulation. Regulating the change to the gear ratios $\gamma_{AT}$ causing the power circulation is, in other words, to limit the change to the gear ratios $\gamma_{AT}$ causing the power circulation as compared to the change to the gear ratios $\gamma_{AT}$ other than the gear ratios $\gamma_{AT}$ causing the power circulation.

In the first embodiment, if the operation mode determining means 68 determines that the system optimum operation mode is selected, the engine operating point control means 70 shifts the operating point of the engine 12 to the side of greater total efficiency $\eta_{TOTAL}$; however, instead of the total efficiency $\eta_{TOTAL}$, the operating point of the engine 12 may be shifted based on a total loss $LSS_{TOTAL}$ acquired by summing a power transmission loss $LSS_{CVT}$ when the power from the engine 12 is transmitted through the electric path and the mechanical path and a loss $LSS_{ENG}$ of the engine 12 (hereinafter referred to as an engine loss $LSS_{ENG}$). Specifically, the operating point of the engine 12 may be shifted to the side of a smaller total loss $LSS_{TOTAL}$. In this case, as compared to the case that the operating point of the engine 12 is not changed depending on the total loss $LSS_{TOTAL}$, the efficiency of the vehicle drive device 10 is increased as a whole, i.e., the total loss $LSS_{TOTAL}$ is reduced, and the vehicle fuel efficiency can be improved. The power transmission loss $LSS_{CVT}$ can be calculated based on the power input to the continuously variable transmission 60, i.e., the engine output Pe, and the combined transmission efficiency $\eta_{CVT}$, and the engine loss $LSS_{ENG}$ can be calculated based on a complete combustion engine output $Pe_{CMP}$ that is a lower heating value per unit time when the fuel supplied to the engine 12 is completely combusted, and the engine efficiency $\eta_{ENG}$.

Figure 21:
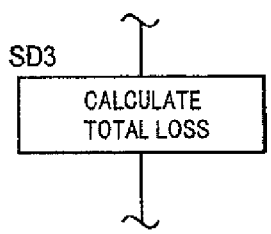
FIG. 21 is a diagram of a step replacing SA3 of FIG. 11 for explaining a flowchart different from that of FIG. 11.
Figure 22:
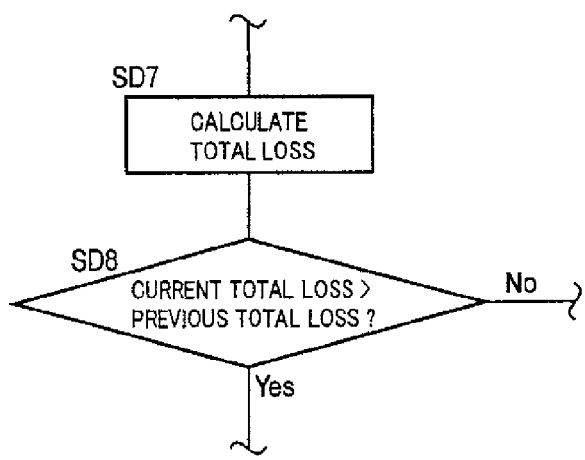
FIG. 22 is a diagram of steps replacing SA7 and SA8 of FIG. 11 for explaining the flowchart described with reference to FIG. 21.

If the operating point of the engine 12 is shifted to the side of a smaller total loss $LSS_{TOTAL}$ as described above, in the flowchart of FIG. 11, SA3 is replaced with SD3 of FIG. 21, and SA7 and SA8 are replaced with SD7 and SD8 of FIG. 22, respectively. SD3, SD7, and SD8 correspond to the engine operating point control means 70.

Specifically describing the flowchart having SD3, SD7, and SD8 in place of SA3, SA7, and SA8 of FIG. 11, SA2 of FIG. 11 is followed by SD3 of FIG. 21, and SD3 is followed by SA4 of FIG. 11. At SD3, as is the case with SA3, the combined transmission efficiency $\eta_{CVT}$ and the engine efficiency $\eta_{ENG}$ are calculated. Fuel consumption in the engine 12 is sequentially detected over time and the complete combustion engine output $Pe_{CMP}$ is calculated based on the fuel consumption per unit time. Relationship between the complete combustion engine output $Pe_{CMP}$ and the fuel consumption per unit time is empirically obtained in advance, for example. The total loss $LSS_{TOTAL}$ is then calculated based on the calculated combined transmission efficiency $\eta_{CVT}$, the engine efficiency $\eta_{ENG}$, and the complete combustion engine output $Pe_{CMP}$.

SA6 of FIG. 11 is followed by SD7 of FIG. 22. At SD7, as is the case with the SD3, the total loss $LSS_{TOTAL}$ based on the current target engine operating point (referred to as a current total loss) is calculated. A previous total loss, i.e., the total loss $LSS_{TOTAL}$ based on the previous target engine operating point, is stored in advance for determination at SD8 of FIG. 22. SD7 is followed by SD8.

At SD8, it is determined whether the previous total loss is smaller than the current total loss. If the determination at SD8 is affirmative, i.e., if the previous total loss is smaller than the current total loss, the operation goes to SA9 of FIG. 11. On the other hand, if the determination at SD8 is negative, the operation goes to SA5 of FIG. 11. Although the replacement of SA3, SA7, and SA8 with SD3, SD7, and SD8, respectively in the flowchart of FIG. 11 makes the difference described above, the other points are the same as the flowchart of FIG. 11.

A plurality of the embodiments described above may be implemented in a mutually combined manner by setting priorities, for example.

The described embodiments are merely exemplary embodiments and, although not exemplarily illustrated one by one, the present invention may be implemented in variously modified and improved forms based on the knowledge of those skilled in the art without departing from the spirit thereof.

EXPLANATIONS OF LETTERS OR NUMERALS 10, 310: vehicle drive device
12: engine
16: torque converter (hydraulic power transmission device)
16p: pump impeller (input-side rotating element)
16t: turbine impeller (output-side rotating element)
18: automatic transmission
40, 140, 240: electronic control device (control device)
58: drive wheels
MG1: first electric motor
MG2: second electric motor

The invention claimed is:

1. A control device for use in a vehicle having: (i) a hydraulic power transmission device including an input-side rotating element to which power from an engine is input and an output-side rotating element outputting power to drive wheels, (ii) a first electric motor directly or indirectly coupled to the input-side rotating element, and (iii) a second electric motor directly or indirectly coupled to the drive wheels, the control device comprising:
a processor programed to execute an engine operating point control including:
a torque of the first electric motor being directly or indirectly adjusted to control an operating point of the engine, and in the control of the operating point of the engine, a torque of the second electric motor being transmitted to the drive wheels;
the torque of the first electric motor being adjusted so that a sum of an engine torque and the torque of the first electric motor is equal to an input-side load torque generated in the input-side rotating element depending on a speed ratio of the hydraulic power transmission device;
the speed ratio of the hydraulic power transmission device being calculated based on a rotation speed of the input-side rotating element and a rotation speed of the output-side rotating element, the rotation speed of the input-side rotating element being equal to an engine rotation speed indicated by a target engine operating point, and the rotation speed of the output-side rotating element being calculated based on a related value to a vehicle speed; and
the input-side load torque being calculated based on the speed ratio of the hydraulic power transmission device and the engine rotation speed indicated by the target engine operating point from a predetermined relationship, and the torque of the first electric motor being determined so that the input-side load torque is equal to a sum of an engine torque indicated by the target engine operating point and the torque of the first electric motor, wherein:
the predetermined relationship for calculating the input-side load torque Tp is equation 1:

$$Tp = \tau \times Ne^2 \quad \text{(equation 1)}$$

where $\tau$ is a capacitive coefficient that represents the speed ratio of the hydraulic power transmission device, and Ne represents the engine rotation speed.

2. The control device of a vehicle drive device of claim 1, wherein
the vehicle drive device includes an automatic transmission interposed between the output-side rotating element and the drive wheels, and wherein
the operating point of the engine is controlled by determining a gear ratio of the automatic transmission and directly or indirectly adjusting the torque of the first electric motor.

3. The control device of a vehicle drive device of claim 2, wherein
the gear ratio of the automatic transmission is changed to the side of higher combined transmission efficiency achieved when power from the engine is transmitted through an electric path, through which power transmission is electrically performed by giving and receiving electric power between the first electric motor and the second electric motor, and a mechanical path, through which power transmission is mechanically performed via the hydraulic power transmission device.

4. The control device of a vehicle drive device of claim 2, wherein
a determinable gear ratio of the automatic transmission is limited depending on an electric power upper limit value allowed for the first electric motor or the second electric motor.

5. The control device of a vehicle drive device of claim 3, wherein
a determinable gear ratio of the automatic transmission is limited depending on an electric power upper limit value allowed for the first electric motor or the second electric motor.

6. The control device of a vehicle drive device of claim 2, wherein
the operating point of the engine is controlled so that the operating point of the engine is located along a predetermined operating curve of the engine while a target value of engine output is achieved, and wherein
a change to a gear ratio of the automatic transmission causing power circulation in which the first electric motor consumes electric power while the second electric motor generates electricity is restricted.

7. The control device of a vehicle drive device of claim 3, wherein
the operating point of the engine is controlled so that the operating point of the engine is located along a predetermined operating curve of the engine while a target value of engine output is achieved, and wherein
a change to a gear ratio of the automatic transmission causing power circulation in which the first electric motor consumes electric power while the second electric motor generates electricity is restricted.

8. The control device of a vehicle drive device of claim 4, wherein
the operating point of the engine is controlled so that the operating point of the engine is located along a predetermined operating curve of the engine while a target value of engine output is achieved, and wherein
a change to a gear ratio of the automatic transmission causing power circulation in which the first electric motor consumes electric power while the second electric motor generates electricity is restricted.

9. The control device of a vehicle drive device of claim 5, wherein
the operating point of the engine is controlled so that the operating point of the engine is located along a predetermined operating curve of the engine while a target value of engine output is achieved, and wherein
a change to a gear ratio of the automatic transmission causing power circulation in which the first electric motor consumes electric power while the second electric motor generates electricity is restricted.

10. The control device of a vehicle drive device of claim 1, wherein
the operating point of the engine is shifted to the side of a larger product of combined transmission efficiency and engine efficiency achieved when power from the engine is transmitted through an electric path, through which power transmission is electrically performed by giving and receiving electric power between the first electric motor and the second electric motor, and a mechanical path, through which power transmission is mechanically performed via the hydraulic power transmission device.

11. The control device of a vehicle drive device of claim 1, wherein
the operating point of the engine is shifted to the side of a smaller total loss acquired by summing a power transmission loss and a loss of the engine power generated when power from the engine is transmitted through an electric path, through which power transmission is electrically performed by giving and receiving electric power between the first electric motor and the second electric motor, and a mechanical path, through which power transmission is mechanically performed via the hydraulic power transmission device.

12. The control device of a vehicle drive device of claim 2, wherein
the second electric motor is coupled between the output-side rotating element of the hydraulic power transmission device and the automatic transmission.

13. The control device of a vehicle drive device of claim 3, wherein
the second electric motor is coupled between the output-side rotating element of the hydraulic power transmission device and the automatic transmission.

14. The control device of a vehicle drive device of claim 4, wherein
the second electric motor is coupled between the output-side rotating element of the hydraulic power transmission device and the automatic transmission.

15. The control device of a vehicle drive device of claim 5, wherein
the second electric motor is coupled between the output-side rotating element of the hydraulic power transmission device and the automatic transmission.

16. The control device of a vehicle drive device of claim 6, wherein
the second electric motor is coupled between the output-side rotating element of the hydraulic power transmission device and the automatic transmission.

17. The control device of a vehicle drive device of claim 7, wherein
the second electric motor is coupled between the output-side rotating element of the hydraulic power transmission device and the automatic transmission.

18. The control device of a vehicle drive device of claim 8, wherein
the second electric motor is coupled between the output-side rotating element of the hydraulic power transmission device and the automatic transmission.

19. The control device of a vehicle drive device of claim 9, wherein
the second electric motor is coupled between the output-side rotating element of the hydraulic power transmission device and the automatic transmission.

* * * * *